US 11,472,465 B2

(12) United States Patent
Nozawa et al.

(10) Patent No.: US 11,472,465 B2
(45) Date of Patent: Oct. 18, 2022

(54) STEERING DEVICE

(71) Applicant: JTEKT CORPORATION, Osaka (JP)

(72) Inventors: Yasuyuki Nozawa, Kashihara (JP);
Norihiro Ochi, Nara (JP); Ryoichi Tokioka, Kashiba (JP); Takeshi Watanabe, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 324 days.

(21) Appl. No.: 16/854,385

(22) Filed: Apr. 21, 2020

(65) Prior Publication Data

US 2020/0339179 A1   Oct. 29, 2020

(30) Foreign Application Priority Data

Apr. 25, 2019 (JP) .............................. JP2019-084476
Apr. 2, 2020 (JP) .............................. JP2020-066929

(51) Int. Cl.
*B62D 1/19* (2006.01)
*B60R 21/203* (2006.01)

(52) U.S. Cl.
CPC ............ *B62D 1/192* (2013.01); *B60R 21/203* (2013.01)

(58) Field of Classification Search
CPC ........ B62D 1/181; B62D 1/183; B62D 1/185; B62D 1/192; B62D 1/197; B60R 21/203
See application file for complete search history.

(56) References Cited

U.S. PATENT DOCUMENTS

| | | | |
|---|---|---|---|
| 7,410,190 B2 * | 8/2008 | Sawada | B62D 1/19 |
| | | | 280/775 |
| 8,650,982 B2 * | 2/2014 | Matsuno | B62D 1/181 |
| | | | 74/492 |
| 8,899,622 B2 * | 12/2014 | Read | B62D 1/181 |
| | | | 280/775 |
| 9,487,228 B2 * | 11/2016 | Fevre | B62D 1/181 |
| 9,919,724 B2 * | 3/2018 | Lubischer | F16H 25/2025 |
| 10,800,442 B2 * | 10/2020 | Ishimura | B62D 1/185 |
| 10,882,548 B2 * | 1/2021 | Freudenstein | B62D 1/181 |
| 10,899,378 B2 * | 1/2021 | Park | B62D 1/181 |
| 10,899,379 B2 * | 1/2021 | Martinez | B62D 1/185 |

(Continued)

FOREIGN PATENT DOCUMENTS

DE       10 2016 202 465 A1    8/2017
JP            2003-118591 A       4/2003

OTHER PUBLICATIONS

Sep. 21, 2020 Extended Search Report issued in European Patent Application No. 20171085.2.

*Primary Examiner* — Laura Freedman
(74) *Attorney, Agent, or Firm* — Oliff PLC

(57) ABSTRACT

A steering device for steering a vehicle includes a movable member, a holding member, an impact absorbing member, a movement driving unit, and a controller. The controller is configured to perform first control and second control by which the movement driving unit is controlled. The first control is a control for moving the movable member along an axial direction of a shaft member within such a range that a front end of at least one of the shaft member and the movable member is located rearward of a space for movement in the front-rear direction of the vehicle. The second control is a control for moving the movable member along the axial direction within such a range that the front end portion is located inside the space for movement.

13 Claims, 11 Drawing Sheets

(56) References Cited

U.S. PATENT DOCUMENTS

| | | | |
|---|---|---|---|
| 10,926,787 B2* | 2/2021 | Swamidason | B60K 37/06 |
| 11,034,376 B2* | 6/2021 | Appleyard | B62D 1/181 |
| 11,142,235 B2* | 10/2021 | Watanabe | B62D 1/183 |
| 11,198,464 B2* | 12/2021 | Watanabe | B62D 1/183 |
| 11,214,293 B2* | 1/2022 | Nishimura | B62D 1/183 |
| 11,247,713 B2* | 2/2022 | Nozawa | B62D 1/10 |
| 11,273,780 B2* | 3/2022 | Horvath | B60R 21/01552 |
| 2015/0232117 A1 | 8/2015 | Stinebring et al. | |
| 2018/0050720 A1 | 2/2018 | King et al. | |
| 2018/0370559 A1 | 12/2018 | Swamidason | |
| 2019/0031224 A1 | 1/2019 | Huber | |
| 2021/0213997 A1* | 7/2021 | Watanabe | B62D 1/181 |
| 2021/0229733 A1* | 7/2021 | Kurokawa | F16B 7/14 |

* cited by examiner

STEERING DEVICE

CROSS-REFERENCE TO RELATED APPLICATION

This application claims priority to Japanese Patent Application No. 2019-084476 filed on Apr. 25, 2019, incorporated herein by reference in its entirety.

BACKGROUND

1. Technical Field

The present disclosure relates to a steering device.

2. Description of Related Art

Japanese Unexamined Patent Application Publication No. 2003-118591 (JP 2003-118591 A) discloses a vehicle steering device in which a steering operation part is movably disposed. In this vehicle steering device, the steering operation part is moved along slide rails that are curved in an arc shape in a vehicle front-rear direction. As the steering operation part is thus moved frontward, the distance from a driver's seat increases as well as the position of the steering operation part lowers. JP 2003-118591 A says that this configuration can prevent the steering operation part from becoming obtrusive to an occupant who gets in or out of the vehicle as well as from hiding an instrument panel.

SUMMARY

When a vehicle is driving autonomously at driving automation level 3 or higher where the system takes full charge of driving, the driver is not required to take charge of operation of the vehicle and therefore need not hold an operating member, such as a steering wheel. The driver's comfort can be increased if the operating member moves during autonomous driving so as to secure a large space in front of the driver, as with the steering device of JP 2003-118591 A.

On the other hand, steering devices are required to have an impact absorbing function to absorb the impact of a driver colliding with an operating member (secondary collision) resulting from the vehicle colliding with other object. It is therefore desirable that a steering device in which an operating member is retracted to a predetermined area in front of a driver's seat do not lose the impact absorbing function as far as possible, even during an action of retracting the operating member. However, when the operating member is moved frontward, a clearance for movement used to absorb impact is reduced, which makes it difficult to maintain both the impact absorbing function and the operating member retraction function without one compromising the other.

The present disclosure provides a steering device that can expand a space in front of a driver as well as enhance collision safety.

A steering device according to one aspect of the present disclosure is a steering device for steering a vehicle and includes a movable member, a holding member, an impact absorbing member, a movement driving unit, and a controller. The movable member is configured to move along with a shaft member in an axial direction of the shaft member and to rotatably support the shaft member. An operating member is connected to a rear end of the shaft member in a front-rear direction of the vehicle. The holding member is configured to hold the movable member so as to move in the axial direction. The impact absorbing member is connected to the movable member and configured to absorb impact as a front end portion of at least one of the shaft member and the movable member in the front-rear direction of the vehicle moves frontward in the axial direction inside a space for movement. The movement driving unit is configured to move the movable member along the axial direction so as to change the position of the movable member in the axial direction in a vehicle body of the vehicle. The controller is configured to perform first control and second control by which the movement driving unit is controlled. The first control is a control for moving the movable member along the axial direction such a range that the front end portion is located rearward of the space for movement in the front-rear direction of the vehicle. The second control is a control for moving the movable member along the axial direction within such a range that the front end portion is located inside the space for movement.

In the steering device according to the one aspect of the present disclosure, the controller may be configured to allow the second control to start when it is determined that there is no need to absorb impact by the impact absorbing member.

In the steering device according to the one aspect of the present disclosure, the controller may be configured to determine that there is no need to absorb impact by the impact absorbing member when the operating member is located frontward of a predetermined position in the front-rear direction of the vehicle.

The steering device according to the one aspect of the present disclosure may further include an airbag housing part. The airbag housing part may be configured to move along with the shaft member in the axial direction and to house an airbag so as to allow the airbag to deploy. The predetermined position may be a position at which the airbag becomes unable to fulfill an expected function.

In the steering device according to the one aspect of the present disclosure, the controller may be configured to determine that there is no need to absorb impact by the impact absorbing member when a running state of the vehicle meets a predetermined condition.

In the steering device according to the one aspect of the present disclosure, the controller may be configured to change, according to a running state of the vehicle, the length of the space for movement in the axial direction that is stored in a predetermined storage area. The controller may be configured to perform the first control and the second control using the changed length in the axial direction.

In the steering device according to the one aspect of the present disclosure, the controller may be configured to change, according to a running state of the vehicle, the length of the space for movement in the axial direction by controlling the movement driving unit.

In the steering device according to the one aspect of the present disclosure, the holding member may have a base member that is fixed to the vehicle body, and an intermediate member that is held by the base member so as to move in the axial direction and configured to hold the movable member so as to move in the axial direction. The movement driving unit may have a first driving part that moves the intermediate member relatively to the base member, and a second driving part that moves the movable member relatively to the intermediate member. The controller may be configured to control the first driving part in the first control so as to move the intermediate member relatively to the base member in a state where the front end portion is located rearward of the space for movement in the front-rear direction of the vehicle, and configured to control the second driving part in the second control so as to move the movable member frontward in the front-rear direction of the vehicle within such a range that the front end portion is located inside the space for movement.

The steering device according to the one aspect of the present disclosure may include a stopper. The stopper may be configured to restrain the movable member from falling off the holding member by coming into contact with at least one of the shaft member and the movable member after the impact absorbing member starts to absorb impact. In the steering device according to the one aspect of the present disclosure, the stopper may include at least one of a front stopper that is configured to restrict frontward movement of the shaft member and the movable member and a rear stopper that is configured to restrict rearward movement of the shaft member and the movable member. In the steering device according to the one aspect of the present disclosure, the at least one of the front stopper and the rear stopper may include a buffer member that is disposed at such a position as to come into contact with at least one of the shaft member and the movable member.

The steering device according to the one aspect of the present disclosure can realize a steering device that can expand a space in front of a driver as well as enhance collision safety.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a steering device according to the present disclosure and modified examples thereof will be specifically described below with reference to the drawings. The embodiment and the modified examples described below each represent a comprehensive or specific example. Numerical values, shapes, materials, components, arrangement and form of connection of the components, steps and order of the steps, etc. shown in the following embodiment and modified examples are merely examples and not intended to limit the present disclosure.

The drawings are schematic views in which some parts are emphasized, omitted, or adjusted in proportion as necessary to show the present disclosure, and the shapes, positional relationships, and proportions may be different from the actual ones. The meanings of expressions of relative directions or postures, such as "parallel" and "orthogonal," that may be used in the following embodiment also include being not exactly in those directions or postures. For example, the meaning of "two directions are parallel" is not limited to that these two directions are perfectly parallel but also includes that these directions are substantially parallel, i.e., with about a few percent deviation, for example.

Embodiment

First, the outlines of the configuration and operation of a steering device 100 according to an embodiment will be described using FIG. 1 to FIG. 3.

Figure 1:
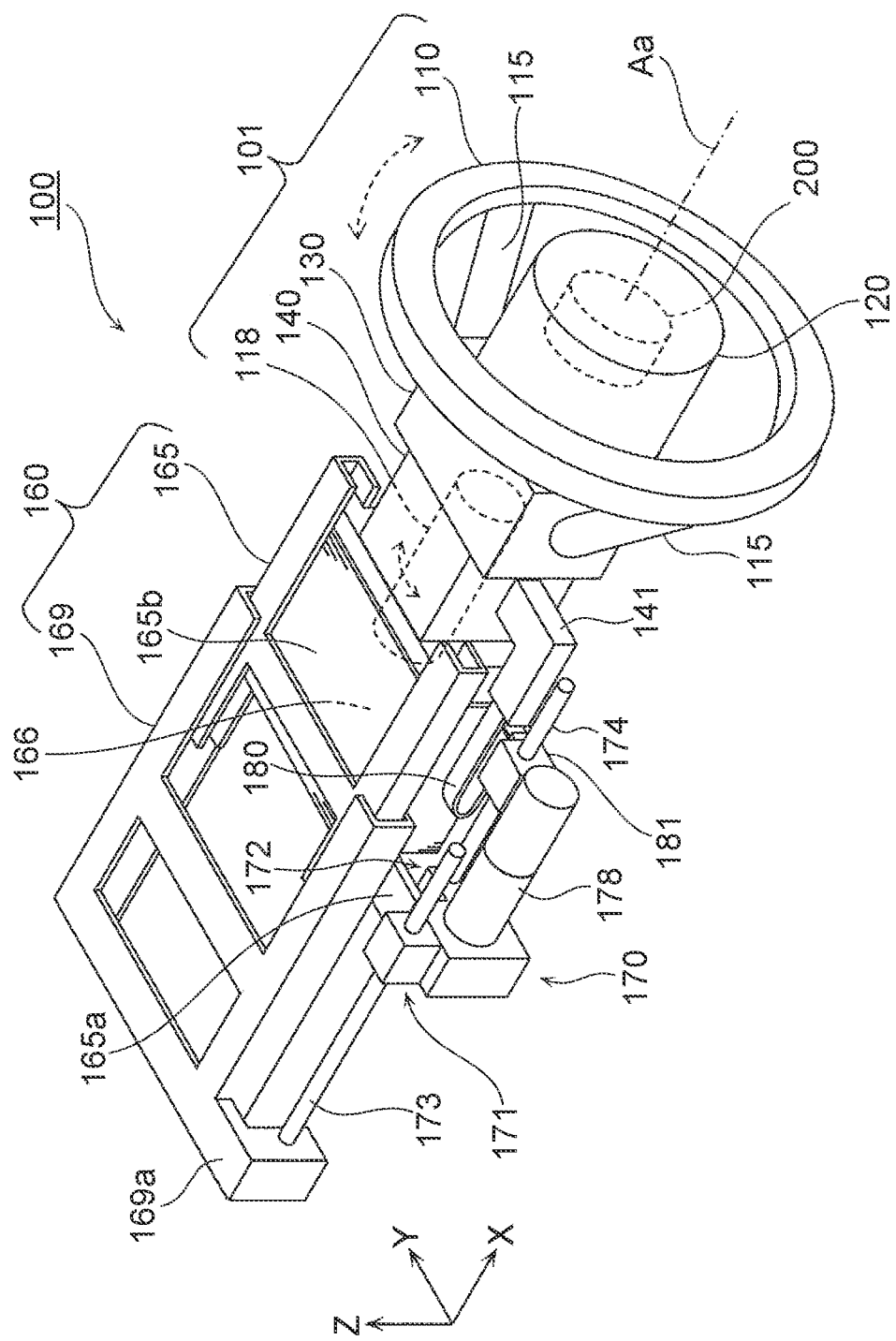
FIG. 1 is a perspective view showing an external appearance of a steering device according to an embodiment.

FIG. 1 is a perspective view showing an external appearance of the steering device 100 according to the embodiment. FIG. 2 is a view schematically showing the structure of the steering device 100 according to the embodiment. FIG. 3 is a block diagram showing the functional configuration of the steering device 100 according to the embodiment.

The steering device 100 according to the embodiment is a device that is installed, for example, in a vehicle capable of switching between manual driving and autonomous driving, such as an automobile, bus, truck, construction machine, or agricultural machine.

Figure 2:
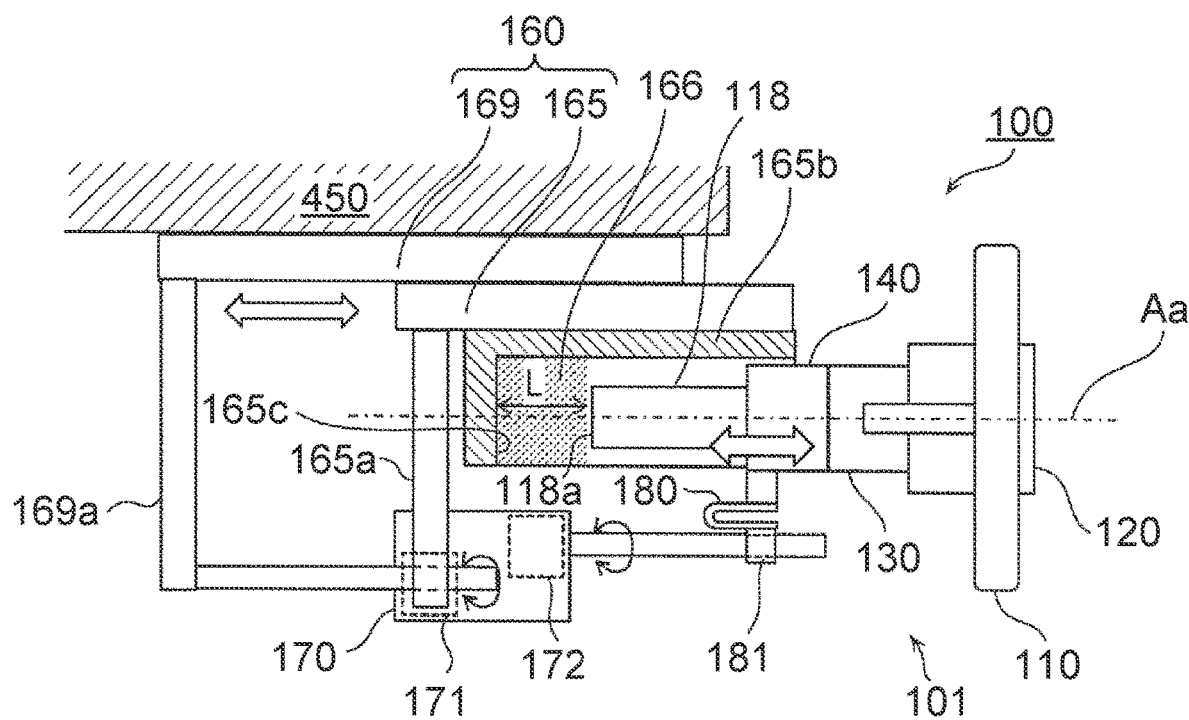
FIG. 2 is a view schematically showing the structure of the steering device according to the embodiment.
Figure 3:
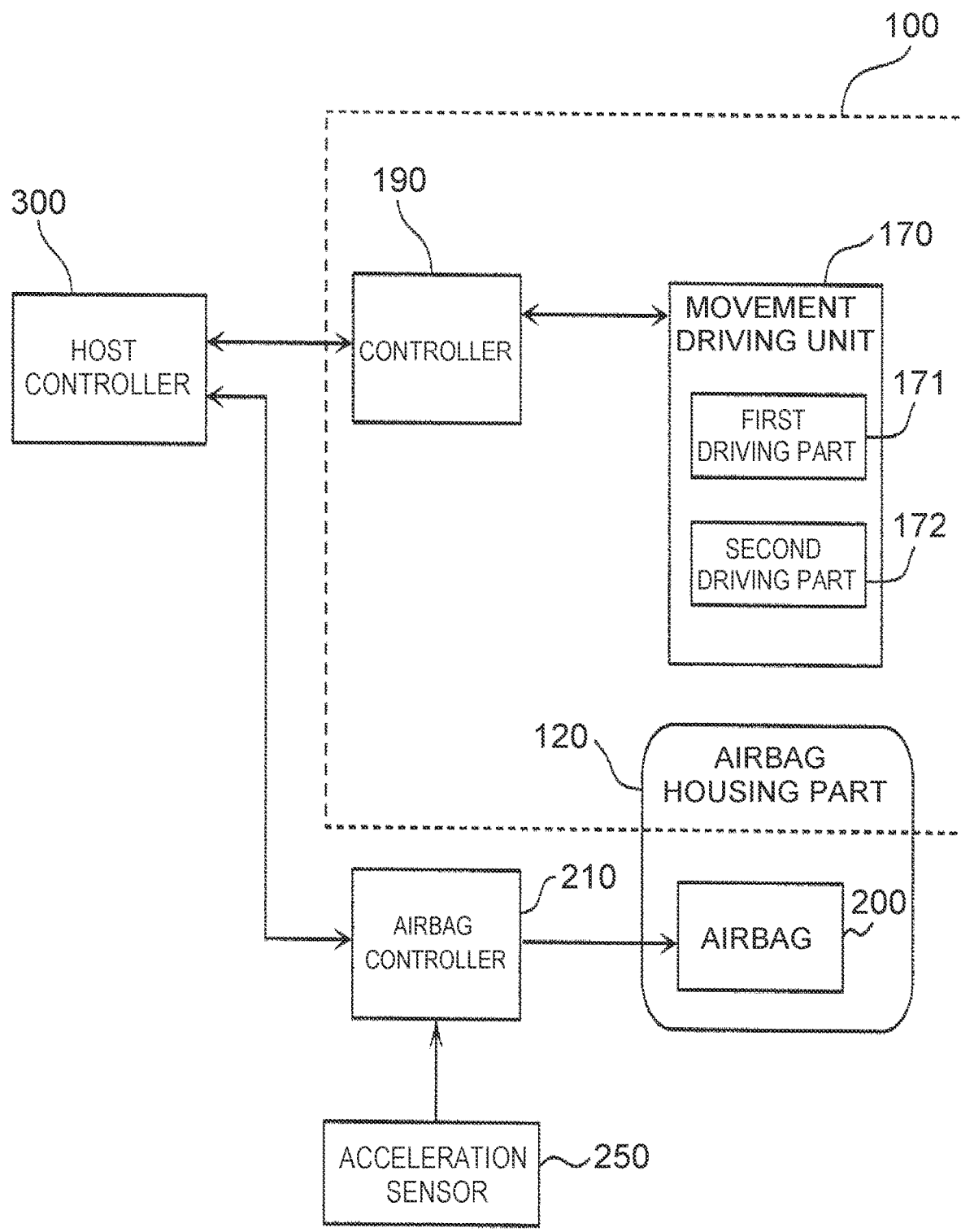
FIG. 3 is a block diagram showing the functional configuration of the steering device according to the embodiment.

As shown in FIG. 1 and FIG. 2, the steering device 100 includes: a shaft member 118 with an operating member 110 connected at a rear end thereof; a movable member 140 that moves in an axial direction along with the shaft member 118 and rotatably supports the shaft member 118; and a holding member 160 that holds the movable member 140 so as to be movable in the axial direction. In FIG. 1, the axial direction of the shaft member 118 (a direction parallel to a steering axis Aa) coincides with an X-axis direction, and a frontward direction in the steering device 100 is a frontward direction in the vehicle equipped with the steering device 100 and an X-axis minus direction. A rearward direction in the steering device 100 is an X-axis plus direction and the opposite direction from the frontward direction. In FIG. 1, the steering axis Aa that is a rotational axis of the shaft member 118 is represented by a long dashed-short dashed line. Hereinafter, a direction referred to simply as an "axial direction" means the axial direction of the shaft member 118 (i.e., a direction parallel to the steering axis Aa). The axial direction and a front-rear direction coincide with each other in this embodiment.

The operating member 110 is, for example, an annular member called a steering wheel, and is connected to an operation support part 130 through support members 115 in this embodiment. The operation support part 130 is a member that rotates as the operating member 110 rotates by being operated by a driver and that is interposed between the operating member 110 and the shaft member 118. The shaft member 118 is connected to the operating member 110 through the operation support part 130, and rotation of the operating member 110 around the steering axis Aa is transmitted to the shaft member 118 through the operation support part 130. The operating member 110 may be directly fixed to the shaft member 118.

The operating member 110 rotates around the steering axis Aa by being operated by the driver, and one or more tires of the vehicle are turned based on the amount of rotation of the operating member 110 etc. Specifically, the steering device 100 is a device that is incorporated in a so-called steer-by-wire system, and the operating member 110 and the tires are not mechanically connected to each other. A wheel turning motor turns one or more tires based on information output from the steering device 100, such as a steered angle of the operating member 110. The steering device 100 further includes a reaction force device that applies to the operating member 110 a torque in reaction to a force exerted by the driver, but depiction and description of this device will be omitted here.

In this embodiment, an airbag housing part 120 is fixed on a driver's side (X-axis plus side) of the operation support part 130, and the airbag housing part 120 is located at a central part of the operating member 110 when the operating member 110 is seen from the driver's side. An airbag 200 is housed in the airbag housing part 120 so as to be able to deploy, and the airbag 200 deploys by pushing and breaking the airbag housing part 120, for example, in a collision of the vehicle.

In this embodiment, the movable member 140 is a member composed of a box that rotatably supports the shaft member 118 and a sliding member that is mounted on the box and slides relatively to the holding member 160. For example, a switch for activating a direction indicator is housed in the box. As the movable member 140 slides relatively to the holding member 160, the shaft member 118 moves in the axial direction relatively to the holding member 160. However, it is not essential that the movable member 140 has a built-in device such as a switch, as long as the movable member 140 functions to move in the axial direction along with the shaft member 118 and rotatably support the shaft member 118.

In this embodiment, the holding member 160 has a base member 169 that is fixed to a vehicle body 450 (see FIG. 2), and an intermediate member 165 that is held by the base member 169 so as to be movable in the axial direction and holds the movable member 140 so as to be movable in the axial direction. Specifically, the intermediate member 165 slides relatively to the base member 169, and the movable member 140 slides relatively to the intermediate member 165. The sliding structure of these three members (the base member 169, the intermediate member 165, and the movable member 140) allows changes to be made to the position of a steering mechanism 101, connected to the movable member 140, in a front-rear direction of the vehicle body 450. The steering mechanism 101 is a structure that includes the operating member 110, the support members 115, the airbag housing part 120, and the operation support part 130 and that moves as one unit as the movable member 140 moves in the axial direction.

Specifically, in this embodiment, the intermediate member 165 and the movable member 140 are driven by a movement driving unit 170 to slide, i.e., move in the axial direction. In this embodiment, the movement driving unit 170 has a first driving part 171 that moves the intermediate member 165 relatively to the base member 169, and a second driving part 172 that moves the movable member 140 relatively to the intermediate member 165. The movement driving unit 170 (the first driving part 171 and the second driving part 172) moves the intermediate member 165 and the movable member 140 by a driving force of a sliding motor 178.

Specifically, the base member 169 has a shaft support part 169a that supports a first driving shaft 173 that is a screw shaft. The first driving shaft 173 is disposed so as to pass through a nut of the first driving part 171 constituting a part of the movement driving unit 170, and the movement driving unit 170 is fixed to the intermediate member 165 through a connecting part 165a. The first driving part 171 applies a force in the axial direction to the first driving shaft 173 by rotating the nut by a driving force of the sliding motor 178. Thus, the movement driving unit 170 moves along the first driving shaft 173 fixed to the base member 169. As a result, the intermediate member 165 connected to the movement driving unit 170 moves (slides) in the axial direction relatively to the base member 169.

The second driving part 172 has a second driving shaft 174 that is a screw shaft protruding rearward from the movement driving unit 170, and the second driving part 172 rotates the second driving shaft 174 by a driving force of the sliding motor 178. A driven member 181 that is a block nut is screwed on the second driving shaft 174. In this embodiment, the driven member 181 is coupled to the movable member 140 through an impact absorbing member 180 and a connecting part 141. In this configuration, the second driving part 172 rotates the second driving shaft 174 by a driving force of the sliding motor 178, thereby causing the driven member 181 to move in the axial direction along the second driving shaft 174. As a result, the movable member 140 connected to the driven member 181 moves relatively to the movement driving unit 170. Since the movement driving unit 170 is fixed to the intermediate member 165, the movable member 140 moves (slides) in the axial direction relatively to the intermediate member 165.

Thus, in the steering device 100 according to the embodiment, the movable member 140 can move in the axial direction relatively to the intermediate member 165 as well as move relatively to the base member 169 along with the intermediate member 165. This configuration allows the driver to change the position of the operating member 110 in the front-rear direction as he or she intends. Thus, the driver can adjust the position of the operating member 110 to a position according to his or her body shape, preference, etc. Moreover, the steering device 100 allows the driver to retract the operating member 110 to a retraction area located frontward of the driver, as he or she intends or according to a result of determination by a controller 190 etc. Thus, a space in front of the driver is expanded, which increases the driver's comfort, for example. An action of retracting the operating member 110 will be described later.

The steering device 100 may further include a tilting mechanism that changes the inclination of the steering mechanism 101 in an up-down direction. The tilting mechanism changes the inclination of the steering mechanism 101 in the up-down direction, for example, by turning the movable member 140 around an axis parallel to a left-right direction (a Y-axis direction in FIG. 1). Thus, the driver can adjust, for example, the position of the operating member 110 in the up-down direction as he or she intends. Alternatively, the tilting mechanism may be configured to change the inclination of the steering mechanism 101 in the up-down direction by turning the intermediate member 165 around an axis parallel to the left-right direction (the Y-axis direction in FIG. 1).

The operation of the movement driving unit 170 having been described above is controlled by the controller 190 (see FIG. 3) included in the steering device 100.

The controller 190 acquires various pieces of information and controls the movement driving unit 170 etc. based on the acquired information. For example, the controller 190 acquires a predetermined command given by the driver through a predetermined operation or results of detection by various sensors. Based on the acquired predetermined command or detection results, the controller 190 controls the movement driving unit 170 so as to move the operating member 110 in the axial direction. Here, the controller 190 acquires, as needed, information showing the positions of the intermediate member 165 and the movable member 140 from the movement driving unit 170. Thus, the controller 190 can recognize, as needed, a relative position of the operating member 110, which is indirectly supported by the movable member 140, with respect to a predetermined reference point.

The controller 190 that performs the above control is realized, for example, by a computer including a central processing unit (CPU), a storage device, such as a memory, an interface for inputting and outputting information, and others. The controller 190 can control the operation of the steering device 100 according to a control signal sent from a host controller 300 etc. and results of detection by sensors, for example, as the CPU executes a predetermined program stored in the storage device.

The airbag 200 housed in the airbag housing part 120 of the steering device 100 acts according to a command from an airbag controller 210 (see FIG. 3) installed in the vehicle. The airbag controller 210 determines whether or not to deploy the airbag 200, for example, based on an acceleration information received from an acceleration sensor 250. When there is a rapid change in acceleration equal to or larger than a threshold value, such as when the vehicle collides with some object, the airbag controller 210 orders the airbag 200 to deploy, and the airbag 200 deploys by activating an inflator. Thus, the airbag 200 inflates instantly.

Basically, the airbag 200 inflates when the vehicle collides with other object as described above. However, when the airbag housing part 120 has receded along with the operating member 110 to a position far away from the driver, the airbag 200 cannot be expected to sufficiently fulfill an impact absorbing function due to the long distance between the airbag 200 and the driver and the presence of a dashboard near the airbag 200. To put it simply, the airbag 200 becomes unable to fulfill the expected function. Therefore, the host controller 300 performs control that, for example, prohibits the airbag controller 210 from deploying the airbag 200, according to the position of the operating member 110, the airbag housing part 120, etc. acquired from the steering device 100. In this case, the safety of the driver is secured, for example, by other airbags etc. (not shown) disposed at positions (e.g., in the ceiling) other than in front of the driver's seat.

The steering device 100 thus configured includes the impact absorbing member 180, other than the airbag 200, as a member for enhancing the collision safety. As described above, the impact absorbing member 180 is interposed between the intermediate member 165 and the movable member 140, and the impact of the driver colliding with the operating member 110 (secondary collision) resulting from the vehicle colliding with other object can be absorbed by the impact absorbing member 180.

Specifically, the intermediate member 165 has a cover 165b, and an energy absorption (EA) space 166 that is an example of the space for movement and allows the shaft member 118 to move frontward is formed inside the cover 165b. In a secondary collision, the shaft member 118 moves frontward inside the EA space 166 while the metal impact absorbing member 180 is deformed or damaged under pressure from the movable member 140. Thus, the impact energy of the secondary collision is absorbed and the safety of the driver is secured. In this embodiment, the space inside the cover 165b, from an intermediate point in the axial direction to a front wall 165c (see FIG. 2) is defined as the EA space 166. While it is not essential that the front wall 165c comes into contact with a front end portion 118a of the shaft member 118 in a secondary collision, the front wall 165c can also function as a restricting member that restricts frontward movement of the shaft member 118 in a secondary collision. The length of the EA space 166 in the axial direction is a length determined, for example, based on the impact absorbing performance required of the steering device 100 and the properties of the impact absorbing member 180.

Since the movable member 140 is a member that moves in the axial direction along with the shaft member 118, the space for movement may be defined with reference to the position of the movable member 140. A range across which the movable member 140 can move in the axial direction and which is a range of movement for absorbing impact may be defined as an EA space. In this case, the impact absorbing member 180 can absorb impact as a front end portion of the movable member 140 moves frontward in the axial direction inside this EA space. In this case, the steering device 100 may include a restricting member that restricts frontward movement of the movable member 140, like the front wall 165c for the shaft member 118.

In what manner the impact absorbing member 180 absorbs impact is not particularly limited. The impact absorbing member 180 may absorb impact by using a shift (friction force) between two members that are in contact with each other, instead of deformation, damage, or breakage of a single member. As another example, the driven member 181 and the connecting part 141 of the movable member 140 may be connected to each other by a resin member, and the resin member may be caused to break in a secondary collision to absorb part of the impact energy resulting from the secondary collision. In this case, this resin member functions as the impact absorbing member. Further, the resin member and the impact absorbing member 180 may be used in combination to absorb impact energy in two stages, first by breakage of the resin member and then deformation etc. of the metal impact absorbing member 180. For example, a case is assumed in which a resin pin is disposed in the U-shaped impact absorbing member 180 (see FIG. 1) so as to extend through the impact absorbing member 180 in the up-down direction. In this case, in a secondary collision, part of the impact energy is absorbed as the resin pin breaks first after the impact absorbing member 180 starts to deform, and the impact energy is further absorbed as the impact absorbing member 180 continues to deform.

Thus, in the steering device 100, the holding member 160 that holds the shaft member 118 through the movable member 140 has the EA space 166 for enhancing the collision safety. In this embodiment, the EA space 166 is used not only as a space in which the shaft member 118 moves in a secondary collision as described above, but also as a space in which the shaft member 118 moves when the operating member 110 is retracted. Basics of this structural feature will be described using FIG. 4 to FIG. 6A.

Figure 4:
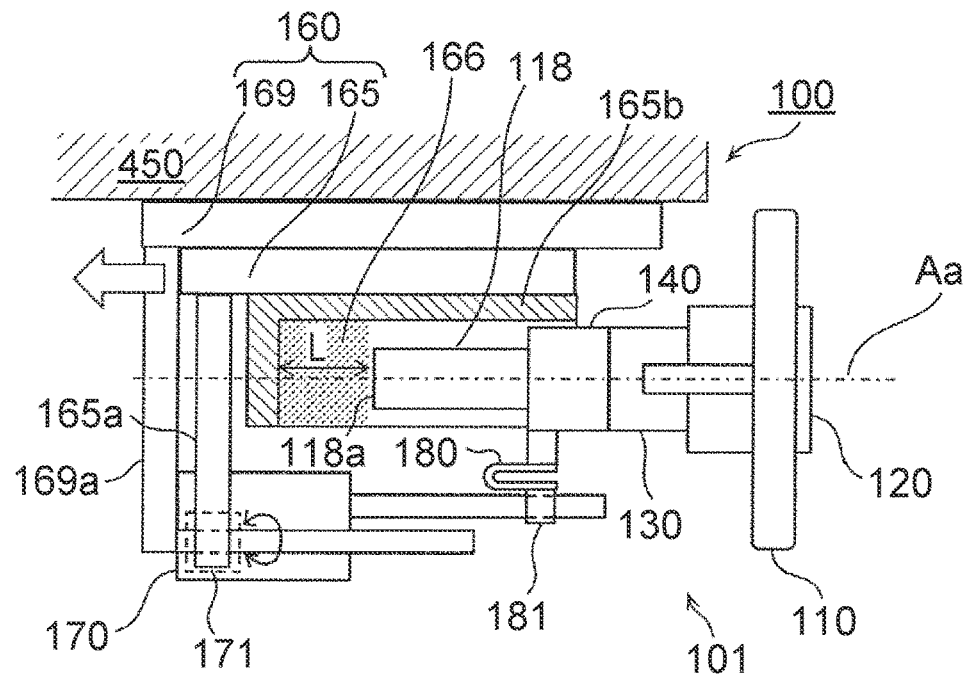
FIG. 4 is a first view showing an action of retracting an operating member in the steering device according to the embodiment.
Figure 5:
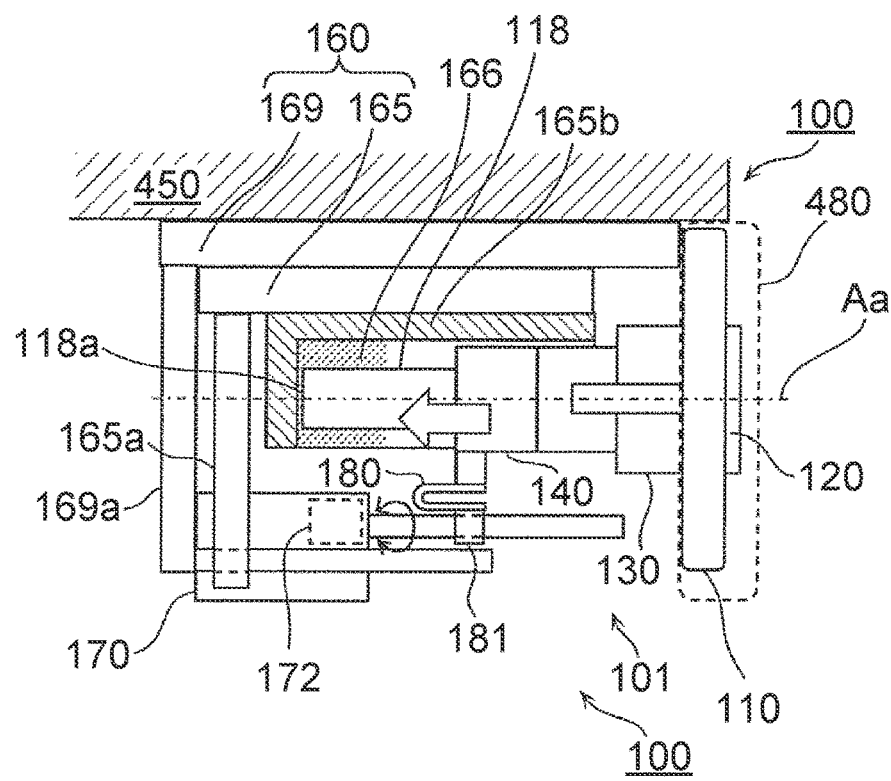
FIG. 5 is a second view showing the action of retracting the operating member in the steering device according to the embodiment.
Figure 6A:
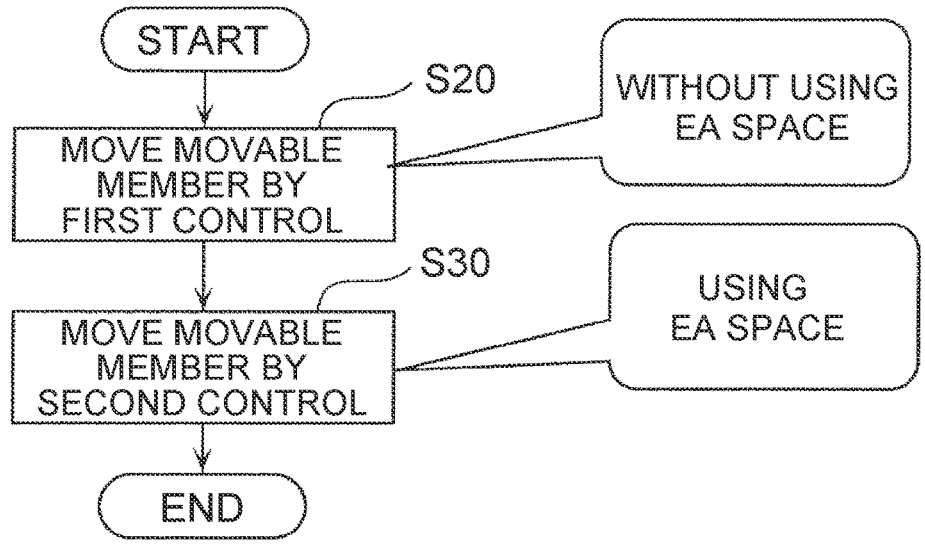
FIG. 6A is a flowchart showing a basic flow of the action of retracting the operating member of the steering device according to the embodiment.

FIG. 4 is a first view showing the action of retracting the operating member 110 in the steering device 100 according to the embodiment. FIG. 5 is a second view showing the action of retracting the operating member 110 in the steering device 100 according to the embodiment. FIG. 6A is a flowchart showing a basic flow of the action of retracting the operating member 110 in the steering device 100 according to the embodiment.

When retracting the operating member 110 to a retraction area 480 (see FIG. 5) located frontward of a normal driving position, first, as shown in FIG. 4, the steering device 100 moves the operating member 110 frontward without using the EA space 166 provided in the holding member 160. The retraction area 480 is provided, for example, inside a dashboard in front of the driver's seat.

The controller 190 performs first control by which the movable member 140 is moved along the axial direction in a state where the front end portion 118a of the shaft member 118 is located rearward of the EA space 166 (S20 of FIG. 6A). Specifically, the controller 190 controls the first driving part 171 so as to move the intermediate member 165 frontward in the axial direction relatively to the base member 169. Thus, the steering mechanism 101 including the operating member 110 moves frontward along with the movable member 140 and the intermediate member 165. Meanwhile, the initial range of the EA space 166 in front of the shaft member 118 is maintained, so that the impact absorbing member 180 can fulfill the impact absorbing function even if a secondary collision occurs while the operating member 110 is moving.

The first control is executed also when adjusting the position of the operating member 110 in the front-rear direction, for example, based on a predetermined operation by the driver. In the steering device 100, when the driver adjusts the position of the operating member 110 in the front-rear direction, the position of the operating member 110 in the front-rear direction is changed without using the EA space 166. Thus, also during and after adjustment of the position of the operating member 110 in the front-rear direction, the EA space 166 is not occupied and there is a clearance for movement required to absorb impact in a secondary collision in front of the shaft member 118. Therefore, the impact absorbing member 180 connected to the shaft member 118 through the movable member 140 can fulfill the expected impact absorbing function.

When retracting the operating member 110 to the retraction area 480, the controller 190 starts second control by which the movable member 140 is moved frontward using the EA space 166 as shown in FIG. 5, after the movable member 140 starts to move frontward under the first control (S30 of FIG. 6A). Specifically, while the intermediate member 165 is moving relatively to the base member 169 or after the intermediate member 165 has moved relatively to the base member 169, the controller 190 controls the second driving part 172 so as to move the movable member 140 frontward in the axial direction relatively to the intermediate member 165. As a result, the operating member 110 is retracted to the retraction area 480.

As has been described above, the steering device 100 according to the embodiment includes the movable member 140, the holding member 160 that holds the movable member 140 so as to be movable in the axial direction, the impact absorbing member 180 connected to the movable member 140, the movement driving unit 170, and the controller 190. The movable member 140 moves in the axial direction along with the shaft member 118 having the operating member 110 connected at the rear end thereof, and rotatably supports the shaft member 118. The impact absorbing member 180 absorbs impact as at least one of the front end portion 118a of the shaft member 118 and the front end portion of the movable member 140 moves frontward in the axial direction inside the EA space 166. The movement driving unit 170 moves the movable member 140 along the axial direction so as to change the position of the movable member 140 in the axial direction in the vehicle body 450 of the vehicle equipped with the steering device 100. The controller 190 performs the first control and the second control by which the movement driving unit 170 is controlled. The first control is a control for moving the movable member 140 along the axial direction within such a range that the front end portion 118a of the shaft member 118 is located rearward of the EA space 166. The second control is a control for moving the movable member 140 along the axial direction within such a range that the front end portion 118a of the shaft member 118 is located inside the EA space 166. The controller 190 is configured to perform, for example, the first control by which the movement driving unit 170 is controlled so as to move the movable member 14o along the axial direction in a state where the front end portion 118a of the shaft member 118 is located rearward of the EA space 166. The controller 190 is configured to, when retracting the operating member 110 to a retraction area 480 located frontward of a normal driving position, start second control by which the movable member 140 is moved frontward within such a range that the front end portion 118a of the shaft member 118 is located inside the EA space, after the movable member 140 starts to move frontward under the first control. In the case where the EA space is defined with reference to the position of the movable member 140, in the first control, the movable member 140 is moved along the axial direction within such a range that the front end portion of the movable member 140 is located rearward of the EA space. In the second control, the movable member 140 is moved along the axial direction within such a range that the front end portion of the movable member 140 is located inside the EA space.

In this configuration, the controller 190 can execute the first control for changing the position of the operating member 110 in the front-rear direction while maintaining the initial range of the EA space 166. Thus, the position of the operating member 110 in the front-rear direction can be adjusted, for example, according to a command from the driver or a value that is set by each driver and stored in a predetermined storage medium (not shown). Moreover, also during or after position adjustment, the steering device 100 can sufficiently fulfill the impact absorbing function by the impact absorbing member 180 in a secondary collision.

Since the operating member 110 can be moved frontward to a position at which it is retracted to the retraction area 480, a large space can be secured in front of the driver during a period in which the driver is not required to operate the operating member 110. The operating member 110 can be retracted to the retraction area 480 by using the EA space 166. Since the shaft member 118 is allowed to enter the EA space 166, the operating member 110 can be moved farther frontward. Thus, in addition to having a structure that allows the operating member 110 to be retracted to the retraction area 480, the steering device 100 can achieve downsizing.

When retracting the operating member 110 to the retraction area 480, the controller 190 according to the embodiment starts the first control by which the operating member 110 is moved frontward without using the EA space 166, and after the start of the first control, starts the second control by which the operating member 110 is moved frontward using the EA space 166. Thus, for example, when performing the action of retracting the operating member 110, the controller 190 can control the retracting action so as to prolong, as much as possible, a period in which impact can be absorbed using the EA space 166 and the impact absorbing member 180. As a result, the steering device 100 can secure the safety of the driver not only during normal driving but also during the action of retracting the operating member 110.

Thus, the steering device 100 according to the embodiment can expand the space in front of the driver as well as enhance the collision safety.

More specifically, in this embodiment, the holding member 160 has the base member 169 that is fixed to the vehicle body 450, and the intermediate member 165 that is held by the base member 169 so as to be movable in the axial direction and holds the movable member 140 so as to be movable in the axial direction. The movement driving unit 170 has the first driving part 171 that moves the intermediate member 165 relatively to the base member 169, and the second driving part 172 that moves the movable member 140 relatively to the intermediate member 165. In the first control, the controller 190 controls the first driving part 171 so as to move the intermediate member 165 holding the shaft member 118 relatively to the base member 169 in the state where the front end portion 118a is located rearward of the EA space 166. In the second control, the controller 190 controls the second driving part 172 so as to move the movable member 140 frontward within such a range that the front end portion 118a of the shaft member 118 is located inside the EA space 166.

In this configuration, the position of the operating member 110 in the front-rear direction is changed as the three members of the base member 169, the intermediate member 165, and the movable member 140 expand and contract in a telescopic manner. Thus, for example, the position of the operating member 110 in the front-rear direction can be adjusted over a relatively wide range. Moreover, the steering device 100 having a structure that allows the operating member 110 to be retracted to the retraction area 480 can be further downsized. The position of the operating member 110 in the front-rear direction can be adjusted, for example, by activating only the first driving part 171, and the initial range of the EA space 166 can be maintained by not activating the second driving part 172. This can avoid complicating the control of movement of the operating member 110 in the front-rear direction in the steering device 100 that has the impact absorbing function using the EA space 166 and the impact absorbing member 180.

In this embodiment, the second driving part 172 is connected to the impact absorbing member 180 through the driven member 181, for example, as shown in FIG. 1 and FIG. 2, and drives the movable member 140 to move in the axial direction through the driven member 181 and the impact absorbing member 180. This means that, at normal times, the impact absorbing member 180 functions as a member that transmits a driving force of the second driving part 172 in the axial direction to the movable member 140. Thus, there is no need for other member that, for example, moves the impact absorbing member 180, connected to the movable member 140, so as to follow movement of the movable member 140. Moreover, in this embodiment, the second driving part 172 rotates the second driving shaft 174 that is a screw shaft to thereby move in the axial direction the driven member 181 that is a block nut through which the second driving shaft 174 is passed. Thus, the second driving part 172 drives the driven member 181 to move by a ball screw mechanism, so that the driven member 181 can exert a sufficient fixing force as a foundation subjected to impact through the impact absorbing member 180. Therefore, for example, the impact absorbing member 180 can fulfil the impact absorbing function as designed in a secondary collision.

When retracting the operating member 110 to the retraction area 480, the timing for the controller 190 to start the second control need not be after moving the intermediate member 165 to an end on a front side of the movable range (a front end of the movable range) relative to the base member 169 by the first control. The controller 190 may drive the second driving part 172 so as to move the movable member 140 relatively to the intermediate member 165, during a period in which the controller 190 controls the first driving part 171 so as to move the intermediate member 165 relatively to the base member 169. Thus, when retracting the operating member 110 to the retraction area 480, the action of retracting the operating member 110 can be efficiently performed if the period in which the operating member 110 is moved frontward by using a driving force of the first driving part 171 and the period in which the operating member 110 is moved frontward by using a driving force of the second driving part 172 overlap each other. In this connection, a specific example of the timing for the controller 190 to start the second control when starting the second control after starting the first control will be described using FIG. 6B to FIG. 9.

Figure 6B:
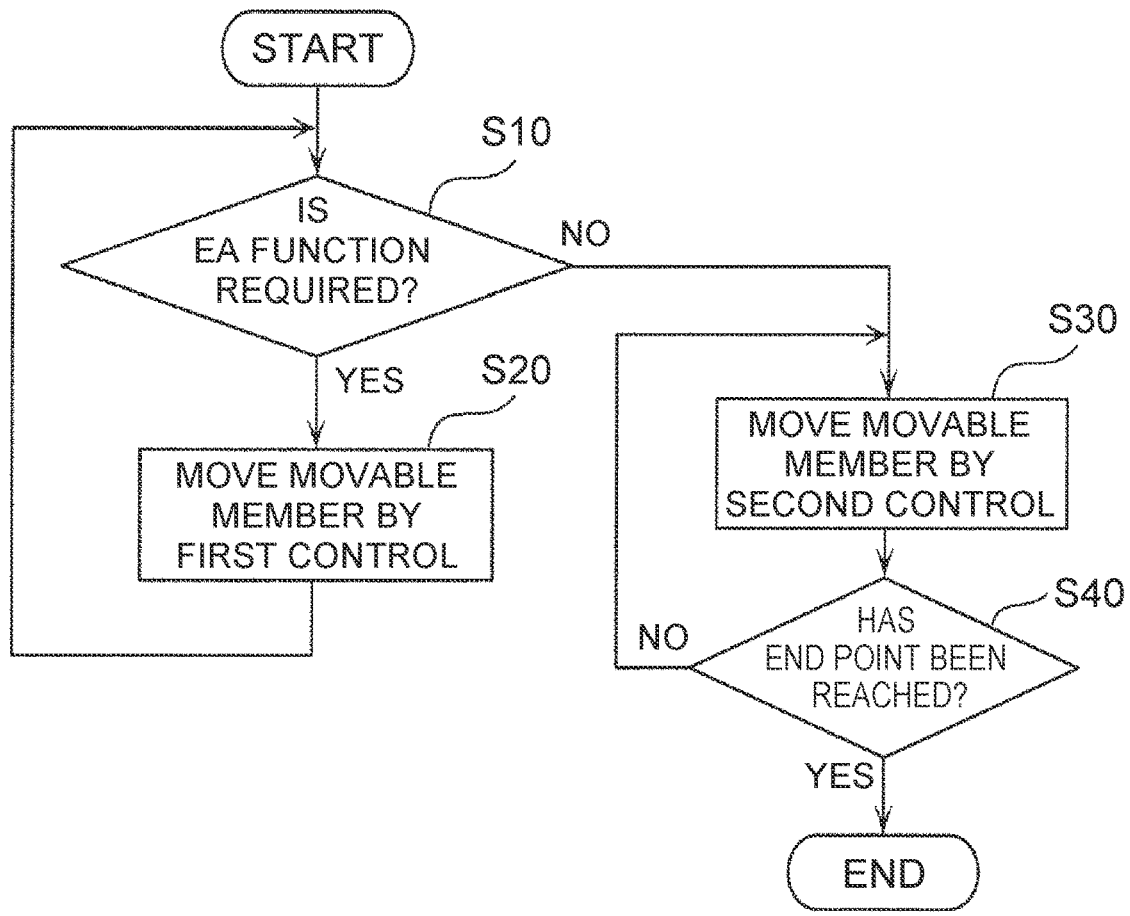
FIG. 6B is a flowchart showing a specific example of the flow of the action of retracting the operating member of the steering device according to the embodiment.
Figure 7:
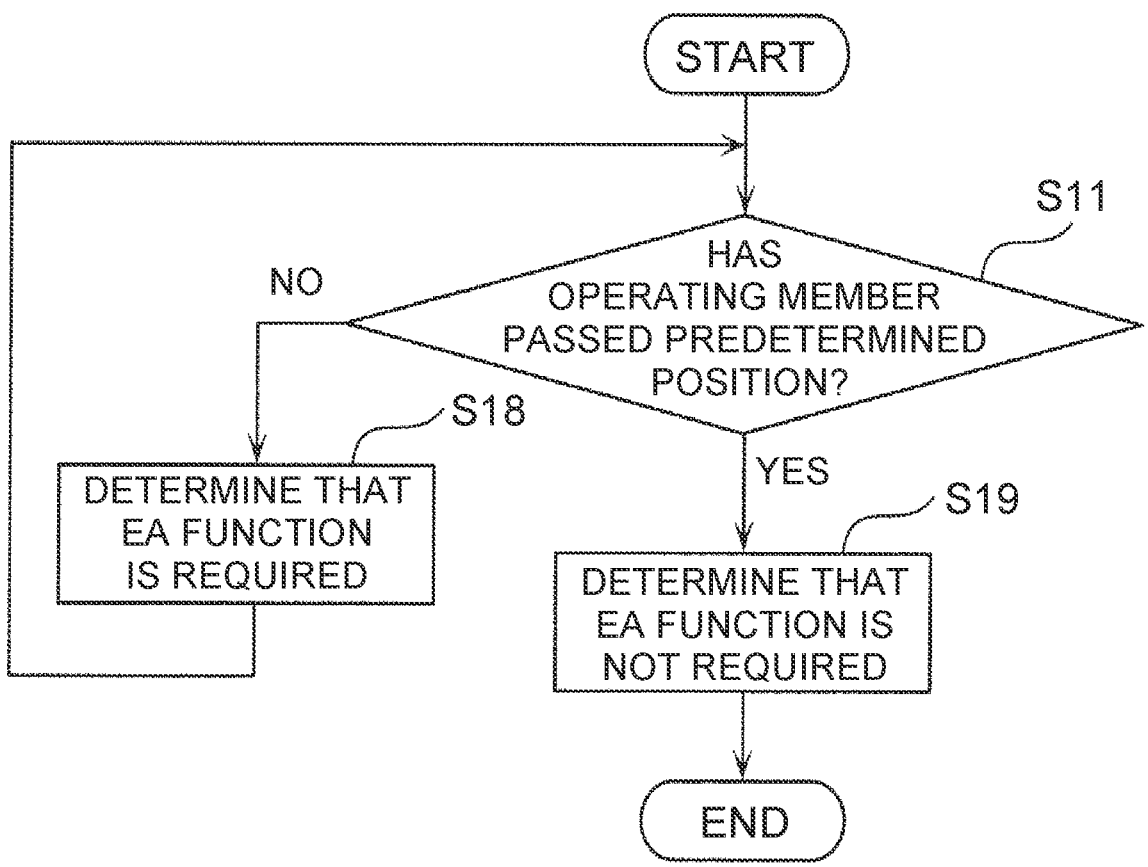
FIG. 7 is a flowchart showing a first example of determination of whether or not an EA function is required that is made by a controller according to the embodiment.
Figure 8A:
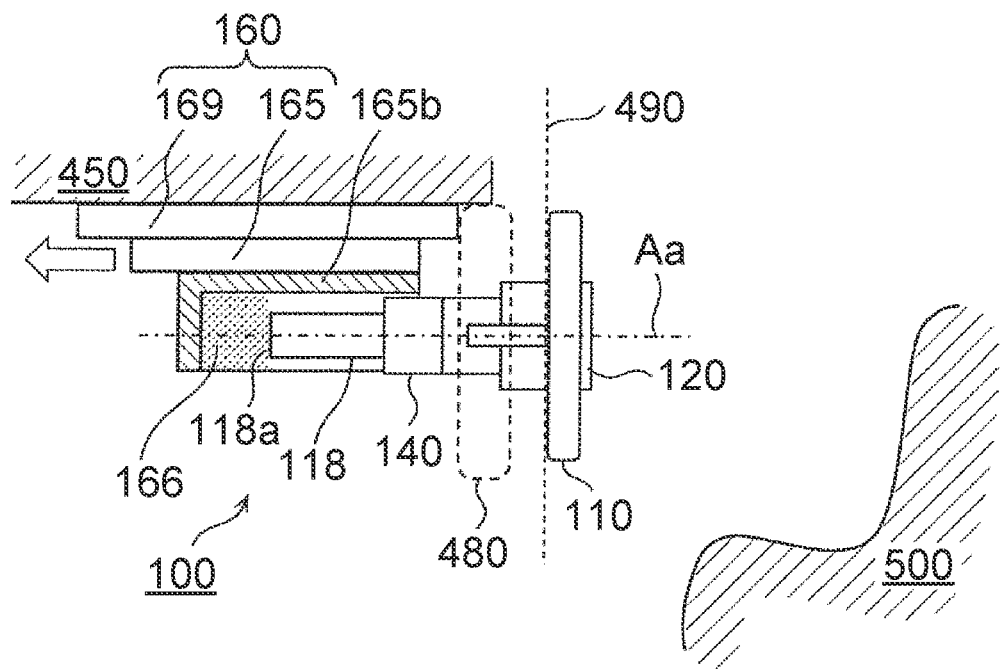
FIG. 8A is a first view corresponding to FIG. 7, illustrating the action of retracting the operating member.
Figure 8B:
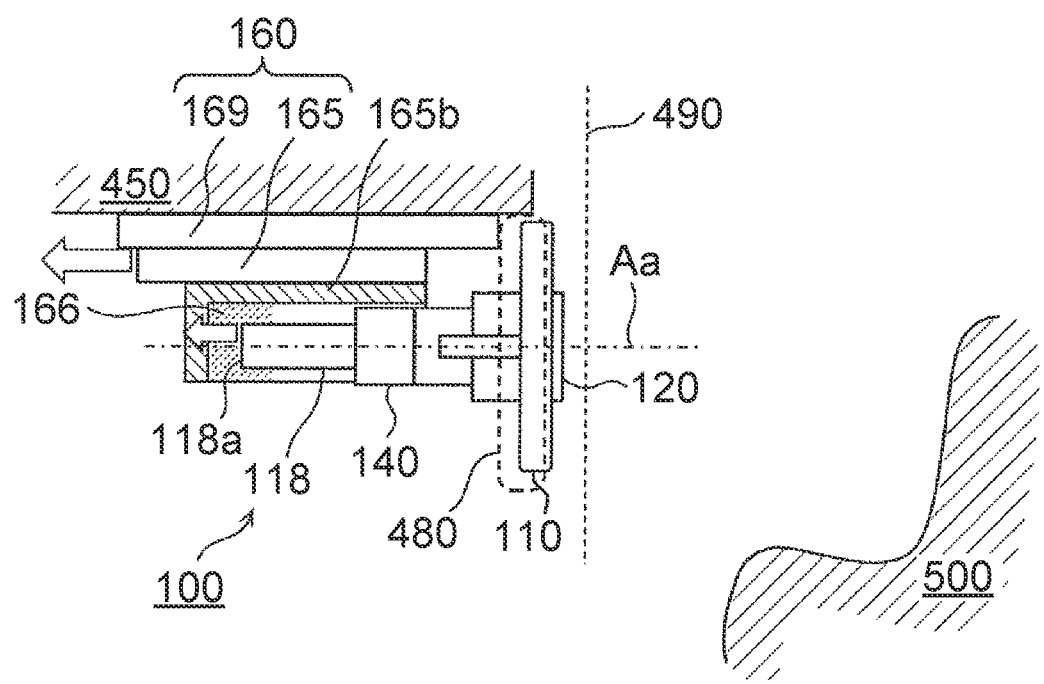
FIG. 8B is a second view corresponding to FIG. 7, illustrating the action of retracting the operating member.

FIG. 6B is a flowchart showing a specific example of the flow of the action of retracting the operating member 110 performed by the steering device 100 according to the embodiment. FIG. 7 is a flowchart showing a first example of determination of whether or not the impact absorbing function is required that is made by the controller 190 according to the embodiment. FIG. 8A is a first view corresponding to FIG. 7, illustrating the action of retracting the operating member 110, and FIG. 8B is a second view corresponding to FIG. 7, illustrating the action of retracting the operating member 110. In FIG. 8A and FIG. 8B, an area that is a part of an area where the driver is present and that is on the side of the operating member 110 is shaded as a driver's area 500. In FIG. 8A and FIG. 8B, to clarify the operation of the steering device 100, some components including the movement driving unit 170 and the impact absorbing member 180 are not shown. These supplementary notes about FIG. 8A and FIG. 8B apply also to FIG. 10A and FIG. 10B to be described later.

As shown in FIG. 6B, the controller 190 determines whether or not the impact absorbing function (hereinafter also written as an "EA function") is required (S10). When the controller 190 determines that the EA function is required (Yes in S10), the controller 190 moves the movable member 140 by the first control (S20). The controller 190 moves the movable member 140 along the axial direction in the state where the front end portion 118a of the shaft member 118 is located rearward of the EA space 166. Specifically, the controller 190 activates the first driving part 171 to move the intermediate member 165 relatively to the base member 169. Since the second driving part 172 is not activated during this movement, the EA space 166 is not used and the EA space 166 and the impact absorbing member 180 can sufficiently fulfill the impact absorbing function. Thereafter, when the controller 190 determines that the EA function is not required (No in S10), the controller 190 allows the second control to start. As a result, the movable member 140 starts to move (S30). The movable member 140 is moved frontward using the EA space 166, and then reaches an end point on the front side of the movable range thereof (Yes in S40). Thus, the operating member 110 is retracted to the retraction area 480. Specifically, the controller 190 moves the movable member 140 relatively to the intermediate member 165 by the second driving part 172. In this case, if the intermediate member 165 has not yet reached the front end of the movable range, the intermediate member 165 is concurrently moved by the first driving part 171.

Here, whether or not the EA function is required can be determined based on whether or not the EA function is effective. At a point when the operating member 110 is located far away from the driver, the impact absorbing member 180 cannot be expected to sufficiently fulfill the EA function in a secondary collision. Since the airbag 200 is also located far away from the driver, it is more likely that the airbag 200 will fail to fulfill its original safety function. Thus, a better idea seems to secure the safety of the driver by other safety mechanisms, such as the other airbags provided at positions other than in front of the driver's seat. In this case, it is determined that the EA function by the impact absorbing member 180 is not required. Therefore, the steering device 100 starts the second control by which the operating member 110 is moved frontward using the EA space 166.

The controller 190 of the steering device 100 recognizes the position of the operating member 110 as needed, and as shown in FIG. 7, for example, when the operating member 110 has not passed a predetermined position after the first control is started (No in S11), the controller 190 determines that the EA function is required (S18). When the operating member 110 has passed the predetermined position (Yes in S11), the controller 190 determines that the EA function is not required (S19).

For example, a case where a predetermined position 490 is defined in front of the driver's area 500 as shown in FIG. 8A is assumed. In this case, when the steering device 100 retracts the operating member 110 to the retraction area 480, the controller 190 moves the movable member 140 frontward without using the EA space 166 by the first control. Thus, the operating member 110 starts to move frontward. Thereafter, for example, when at least part of the operating member 110 has passed the predetermined position 490, as shown in FIG. 8B, the controller 190 starts to move the movable member 140 frontward by the second control. Thus, the movable member 140 moves frontward relatively to the intermediate member 165, and the front end portion 118a of the shaft member 118 moves frontward inside the EA space 166. At the start of the second control, the intermediate member 165 has not yet reached the front end of the movable range, and therefore the controller 190 continues to move the intermediate member 165 frontward relatively to the base member 169. Thereafter, when the intermediate member 165 has reached the front end of the movable range, the controller 190 stops operation of the first driving part 171. When the movable member 140 has reached the front end of the movable range, the controller 190 stops operation of the second driving part 172. The movable range of each of the intermediate member 165 and the movable member 140 is defined, for example, as a range which is required to move the operating member 110 from the normal driving position to the retracted position and which is within a range across which the intermediate member 165 or the movable member 140 can physically move. Thus, the movable range of each of the intermediate member 165 and the movable member 140 does not necessarily match the physically movable range thereof.

As has been described, when retracting the operating member 110 to the retraction area 480, the controller 190 transitions from a state where the EA space 166 is not used to a state where the EA space 166 is used for movement, at a predetermined timing after starting to move the operating member 110 frontward. The timing of this transition is a timing when the EA function by the impact absorbing member 180 becomes unnecessary (ineffective). The movement of the operating member 110 is controlled such that the EA function of the impact absorbing member 180 remains available for as long as possible during retraction of the operating member 110 to the retraction area 480. Thus, the safety of the driver is more reliably secured. Since the transition timing (the timing of stating the second control) is based on the position of the operating member 110, the controller 190 can recognize this timing easily or accurately, for example, by information acquired from the movement driving unit 170. The position of the operating member 110 need not be directly used to determine whether or not the operating member 110 has passed the predetermined position. Since the movable member 140 and the operating member 110 move in synchronization with each other, whether or not the operating member 110 has passed the predetermined position for the operating member 110 may be determined by detecting whether or not the movable member 140 has passed a predetermined position for the movable member 140.

The predetermined position for the operating member 110 may be determined, for example, based on whether or not the airbag 200 is effective. The steering device 100 according to this embodiment includes the airbag housing part 120 that moves along with the shaft member 118 in the axial direction and houses the airbag 200 so as to allow the airbag 200 to deploy. The predetermined position for the operating member 110 may be a position at which the airbag 200 becomes unable to fulfill the expected function.

Since the airbag housing part 120 moves along with the operating member 110, when the airbag 200 has moved far away from the driver, the airbag 200 becomes unable to fulfill the expected function as described above. Therefore, when the position of the operating member 110 has moved frontward to such an extent that the effectiveness of the airbag 200 is lost, practically, the EA function of the impact absorbing member 180 does not effectively work either. Therefore, the controller 190 may determine that the EA function is not required (S19 of FIG. 7) and start to move the movable member 140 by the second control, i.e., using the EA space 166.

Figure 9:
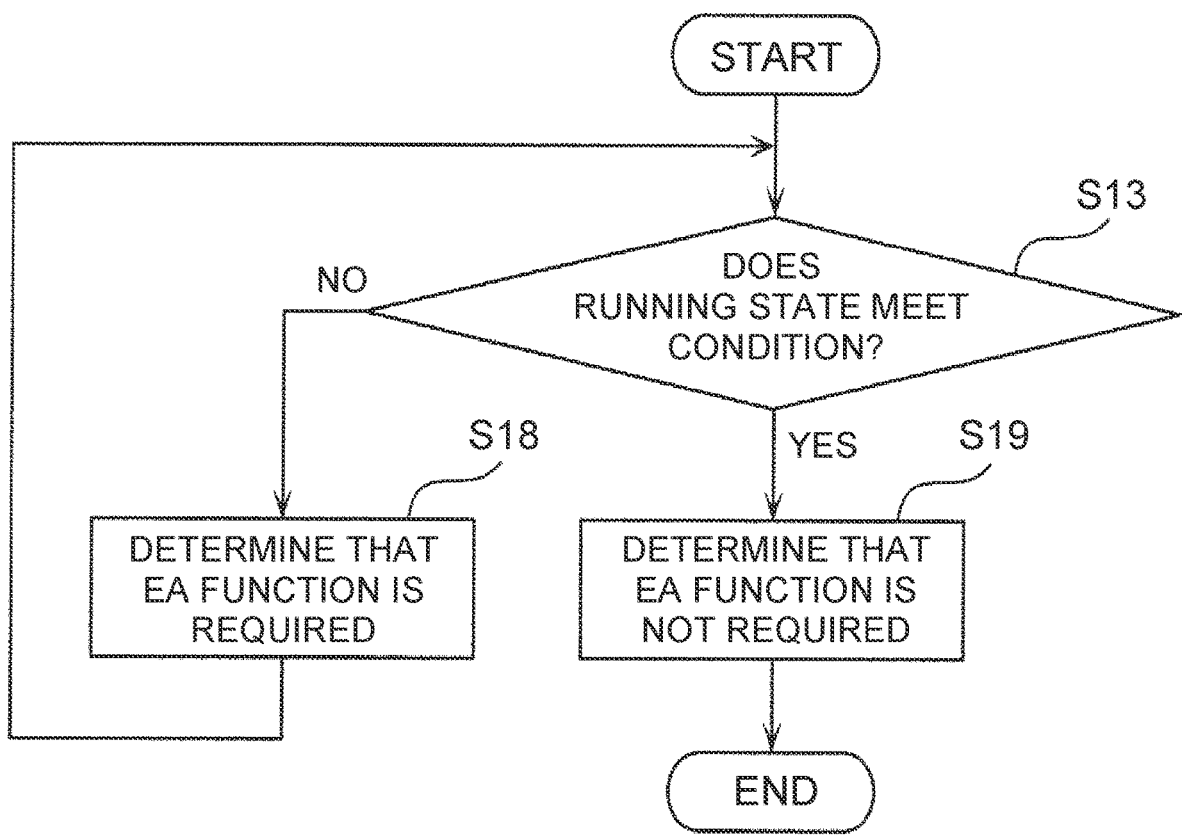
FIG. 9 is a flowchart showing a second example of determination of whether or not the EA function is required that is made by the controller according to the embodiment.

The controller 190 may determine whether or not the EA function is required also based on other criterion. FIG. 9 is a flowchart showing a second example of determination of whether or not the EA function is required that is made by the controller 190 according to the embodiment.

As shown in FIG. 9, the controller 190 acquires a running state of the vehicle equipped with the steering device 100, and when the acquired running state meets a predetermined condition (Yes in S13), the controller 190 determines that the EA function is not required (S19). When the acquired running state does not meet the predetermined condition (No in S13), the controller 190 determines that the EA function is required (S18).

Examples of the running state of the vehicle include each and combinations of a running speed, acceleration, running direction (direction of turned wheels), and the presence or absence of other vehicle ahead.

For example, the controller 190 acquires the running speed of the vehicle from the host controller 300, and if the acquired running speed is equal to or lower than a speed threshold value (Yes in S13), the controller 190 determines that the EA function is not required (S19). For example, if the running speed acquired after the first control for retracting the operating member 110 is started is lower than a speed that is commonly regarded as slow (including zero speed (the vehicle is stationary)) (Yes in S13), there is a low risk of a secondary collision, so that the controller 190 determines that the EA function is not required (S19). Therefore, the controller 190 starts to move the movable member 140 frontward by the second control (S30 in FIG. 6B).

As another example, the controller 190 may determine that the EA function is not required when the acquired running speed is equal to or lower than the speed threshold value and the acceleration is negative, and may determine that the EA function is required when the acquired running speed is equal to or lower than the speed threshold value and the acceleration is positive.

Even when the vehicle is running slowly at the point when the action of retracting the operating member 110 is started, if the acceleration is positive, there is likely to be a higher risk of a secondary collision, so that the controller 190 determines that the EA function is required (S18). Therefore, the controller 190 continues to move the movable member 140 frontward by the first control (S20 of FIG. 6B).

When there is other vehicle within a predetermined distance ahead of the vehicle equipped with the steering device 100, the controller 190 may determine that the EA function is required (S18) regardless of other conditions, such as the running speed. For example, in a case where the vehicle is equipped with a damage mitigation braking system that activates an automatic brake based on a result of detection by a camera etc., it is possible to determine whether there is any other vehicle within the predetermined distance ahead of the vehicle. The controller 190 can determine whether there is any other vehicle within the predetermined distance ahead, for example, by acquiring this determination result by the damage mitigation braking system or a result of detection by the camera etc. from the host controller 300.

The threshold value for the running speed as the predetermined condition may be changed according to whether there is any other vehicle ahead or the distance to other vehicle. For example, a threshold value when there is other vehicle within the predetermined distance ahead at the point when the action of retracting the operating member 110 is started may be set to be lower than a threshold value when there is no other vehicle within the predetermined distance ahead at that point. Thus, the controller 190 determines that the EA function is required (S18) when there is other vehicle ahead at a relatively close position, except when the vehicle equipped with the steering device 100 is running at a very low speed or stationary.

With the running state of the vehicle thus taken into account when determining whether or not the EA function is required, the action of retracting the operating member 110 so as to enhance the collision safety is more accurately performed.

The dimensions of the EA space 166 provided in the holding member 160 need not be fixed, and may be changed, for example, according to the running state of the vehicle.

Figure 10A:
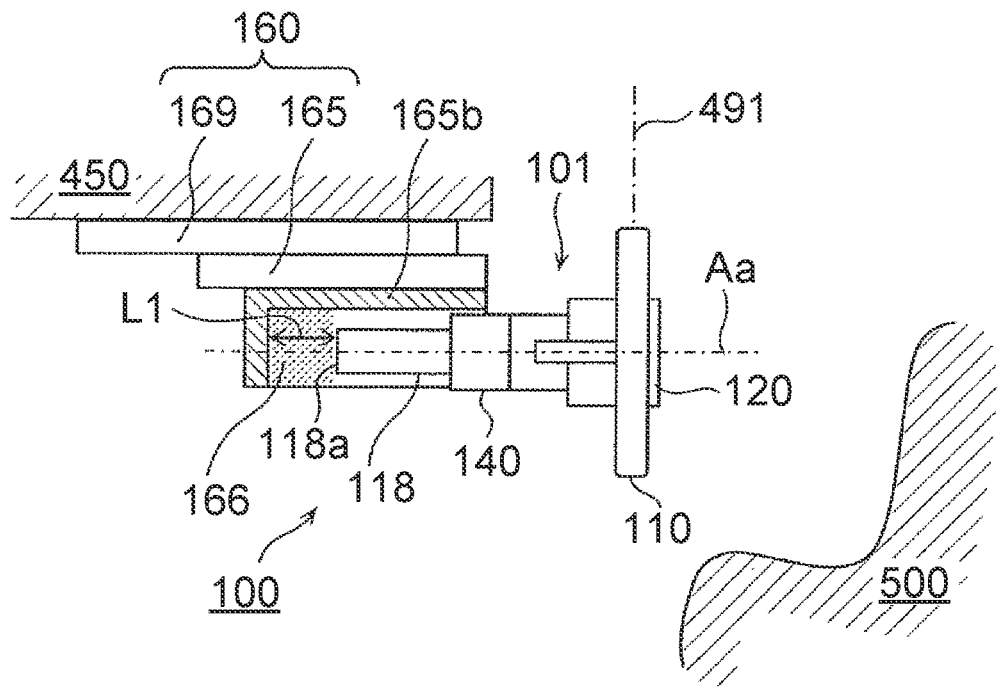
FIG. 10A is a first view illustrating control for changing an EA space that is performed by the controller according to the embodiment.
Figure 10B:
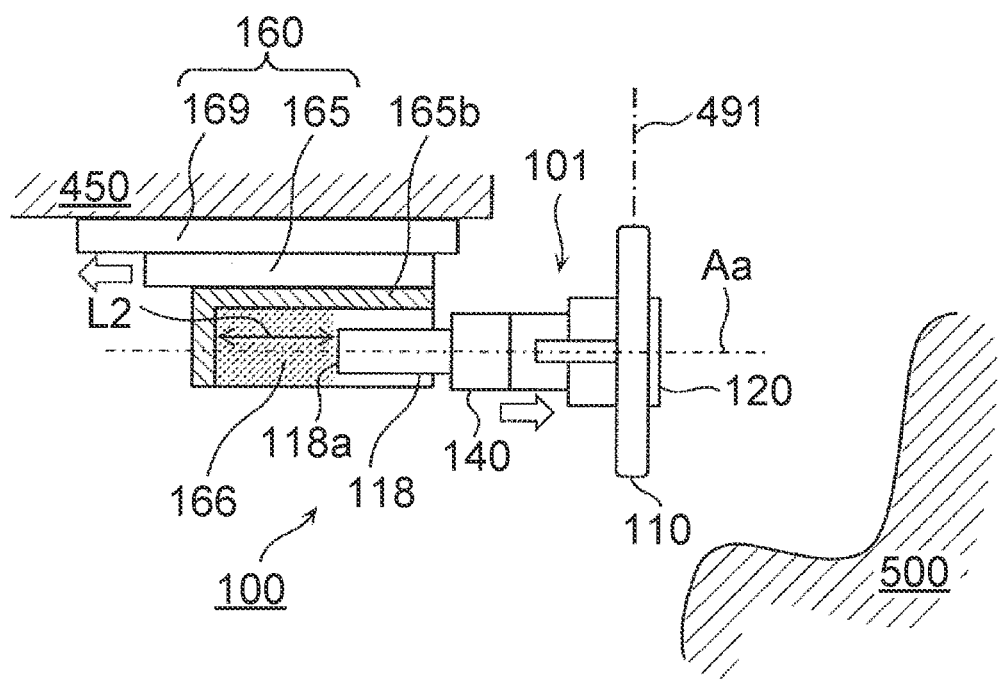
FIG. 10B is a second view illustrating control for changing the EA space that is performed by the controller according to the embodiment.

FIG. 10A is a first view illustrating control for changing the EA space 166 performed by the controller 190 according to the embodiment, and FIG. 10B is a second view illustrating the control for changing the EA space 166 performed by the controller 190 according to the embodiment.

As shown in FIG. 10A and FIG. 10B, the controller 190 can change the length of the EA space 166 in the axial direction by controlling the movement driving unit 170 according to the running state of the vehicle.

Specifically, the running state is the running speed etc. as mentioned above. For example, when the running speed acquired from the host controller 300 is equal to or higher than a predetermined value, the controller 190 changes the length of the EA space 166 in the axial direction from a length L1 shown in FIG. 10A to a length L2 shown in FIG. 10B (L2>L1). To put it simply, the controller 190 makes the length of the EA space 166 in the axial direction longer as the running speed becomes higher. Thus, as the running speed is higher, the moving distance over which the shaft member 118 moves frontward with deformation, damage, or the like of the impact absorbing member 180 is longer. This means that the impact absorbing member 180 can absorb a larger amount of impact. As a result, the collision safety is further enhanced.

To increase the length of the EA space 166 in the axial direction from L1 to L2, the intermediate member 165 is moved frontward relatively to the base member 169 and the movable member 140 is moved rearward relatively to the intermediate member 165. Thus, as shown in FIG. 10A and FIG. 10B, the position of the operating member 110 (a normal driving position 491) can be kept at the same position before and after the length of the EA space 166 in the axial direction is changed. In the steering device 100 according to the embodiment, therefore, the operating member 110 can be kept at the same position relative to the driver even when the length of the EA space 166 in the axial direction is changed to enhance safety.

While the steering device 100 according to the embodiment has been described above, the steering device 100 may have a configuration different from that shown in FIG. 1 to FIG. 10B. Modified examples of the steering device 100 will be described below with focus on differences from the above embodiment.

Modified Example 1

Figure 11:
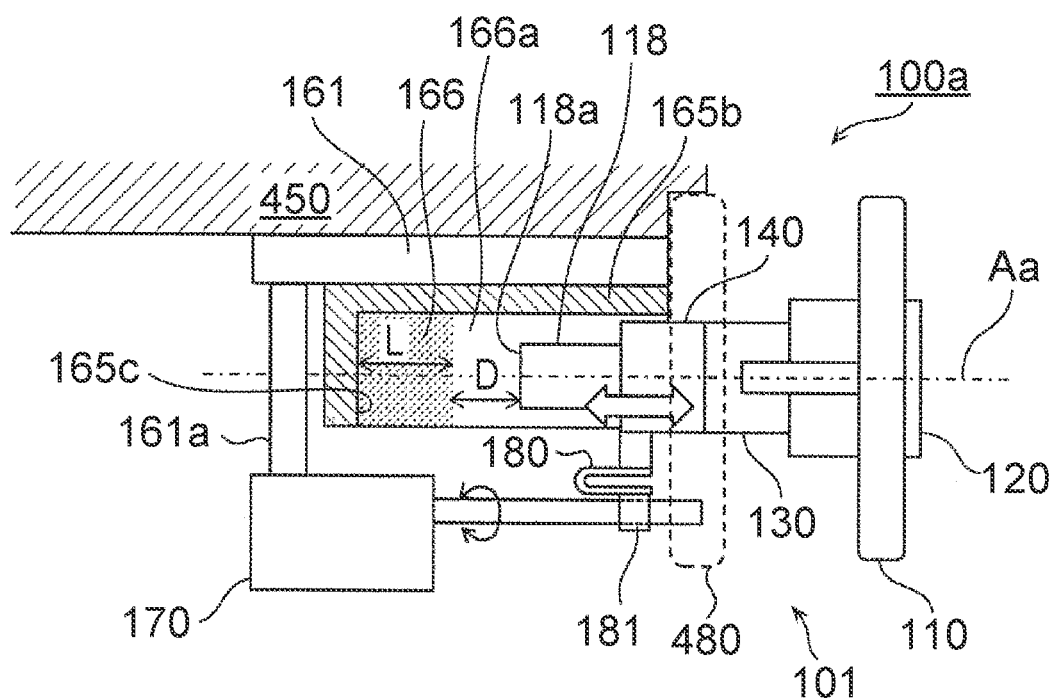
FIG. 11 is a view schematically showing the structure of a steering device according to Modified Example 1 of the embodiment.

FIG. 11 is a view schematically showing the structure of a steering device 100*a* according to a modified example of the embodiment. As shown in FIG. 11, the steering device 100*a* according to this modified example includes a movable member 140, a holding member 161 that holds the movable member 140 so as to be movable in the axial direction, an impact absorbing member 180 connected to the movable member 140, and a movement driving unit 170. The movement driving unit 170 is controlled by a controller 190 (see FIG. 3) not shown in FIG. 11. The movable member 140 moves in the axial direction along with a shaft member 118 having an operating member 110 connected at a rear end thereof, and rotatably supports the shaft member 118. The impact absorbing member 180 absorbs impact as a front end portion 118*a* of the shaft member 118 moves frontward in the axial direction inside an EA space 166 provided in the holding member 161. The movement driving unit 170 moves the position of the movable member 140 in the axial direction in a vehicle body 450 of the vehicle equipped with the steering device 100*a*. The controller 190 performs first control by which the movement driving unit 170 is controlled so as to move the movable member 140 along the axial direction in a state where the front end portion 118*a* of the shaft member 118 is located rearward of the EA space 166. When retracting the operating member 110 to a retraction area 480 located frontward of a normal driving position, the controller 190 starts second control by which the movable member 140 is moved frontward within such a range that the front end portion 118*a* of the shaft member 118 is located inside the EA space 166, after the movable member 140 starts to move frontward under the first control. In this modified example, the EA space may be defined with reference to the position of the movable member 140 as in the above embodiment.

Thus, the steering device 100*a* according to this modified example has the same configuration as the steering device 100 according to the embodiment. Therefore, the steering device 100*a* according to this modified example has the advantage of being able to expand the space in front of the driver as well as enhance the collision safety as described in the embodiment.

The holding member 161 according to this modified example is different from the holding member 160 according to the embodiment in that it is not divided into the base member and the intermediate member. Also in this case, as shown in FIG. 11, the EA space 166 that allows the shaft member 118 to move frontward is defined inside a cover 165*b* of the holding member 161, and a space 166*a* for adjusting a width D in the axial direction is provided between the EA space 166 and the front end portion 118*a* of the shaft member 118.

When adjusting the position of the operating member 110 in the front-rear direction, for example, based on a predetermined operation by the driver, the controller 190 moves the movable member 140 in the axial direction relatively to the holding member 161 within such a range that the front end portion 118*a* of the shaft member 118 is located inside the space for adjustment 166*a* (first control). When retracting the operating member 110 to the retraction area 480, the controller 190 moves the movable member 140 frontward by the first control, and further moves the movable member 140 frontward by the second control. Thus, the shaft member 118 moves frontward inside the EA space 166, and as a result, the operating member 110 is retracted to the retraction area 480.

In this modified example, when a secondary collision occurs, for example, in a state where the movable member 140 is located at the position shown in FIG. 11, the front end portion 118*a* of the shaft member 118 enters the EA space 166 by passing through the space for adjustment 166*a*. This means that the space for adjustment 166*a* is also a space that is used to absorb impact by the impact absorbing member 180. Therefore, the entire space with a length of L+D in the axial direction inside the cover 165*b* in FIG. 11 can be regarded as a space for impact absorption (space for movement). In this case, the following interpretation is possible: part of the space for impact absorption is used to adjust the position of the operating member 110, and in a secondary collision, the entire space for impact absorption is used to move the shaft member 118.

In this regard, in this modified example, the space for adjustment 166*a* and the EA space 166 are distinguished from each other, with the former as a space used for normal position adjustment of the operating member 110 and the latter as a space that is not used for normal position adjustment of the operating member 110. Thus, in this modified example, while the EA space 166 and the space for adjustment 166*a* are continuous with each other, the EA space 166 is a space secured as a space used to absorb impact and retract the operating member 110 in the control of the controller 190.

Modified Example 2

Figure 12:
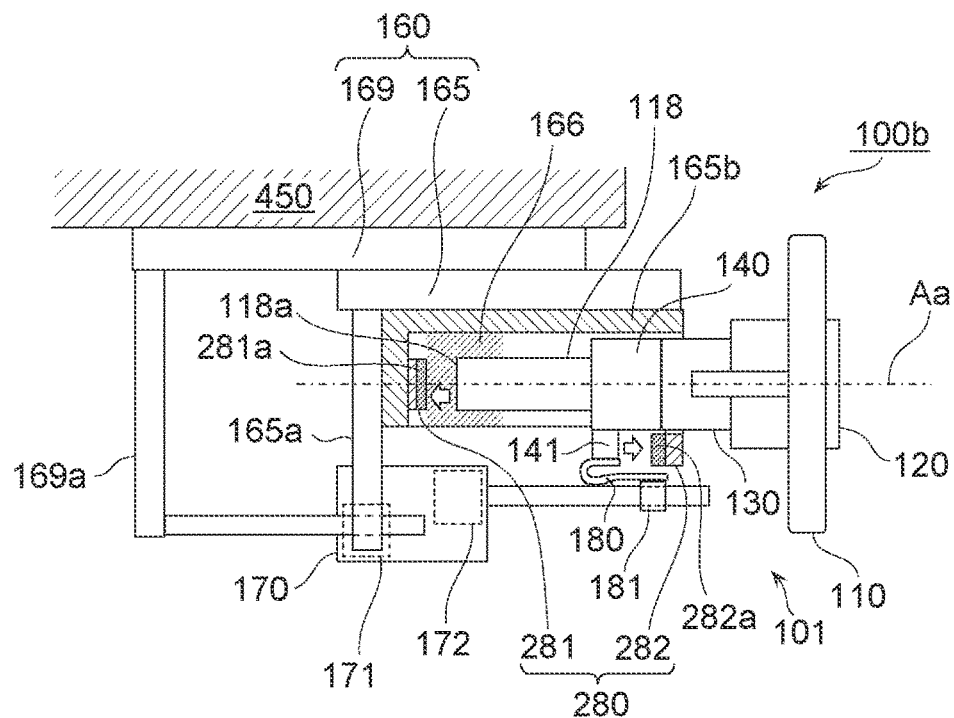
FIG. 12 is a view schematically showing the structure of a steering device according to Modified Example 2 of the embodiment.

FIG. 12 is a view schematically showing the structure of a steering device 100*b* according to Modified Example 2 of the embodiment. As shown in FIG. 12, the steering device 100*b* according to this modified example includes a movable member 140, a holding member 160, and an impact absorbing member 180. In the steering device 100*b*, when a secondary collision occurs, the impact absorbing member 180 absorbs the impact as a front end portion 118*a* of a shaft member 118 moves frontward inside an EA space 166. The steering device 100*b* according to this modified example has these configuration and operation in common with the steering device 100 according to the embodiment.

As shown in FIG. 12, the steering device 100*b* according to this modified example features a stopper 280 that prevents the movable member 140 from falling off the holding member 160. Specifically, in this modified example, the stopper 280 includes a front stopper 281 and a rear stopper 282. The front stopper 281 is disposed at such a position that the front end portion 118*a* of the shaft member 118 can come into contact with the front stopper 281. The rear stopper 282 is disposed at such a position that a connecting part 141 of the movable member 140 can come into contact with the rear stopper 282, and is directly or indirectly fixed, for example, to the holding member 160 or a vehicle body 450.

A case is assumed where, for example, a secondary collision occurs and the impact absorbing member 180 starts to absorb the impact, i.e., the front end portion 118*a* of the shaft member 118 moves frontward in the axial direction inside the EA space 166 while the impact absorbing member 180 deforms. In this case, the movable member 140 moves relatively to the holding member 160 beyond a normal movable range for adjusting the position of an operating member 110 in the front-rear direction, faster than a normal moving speed. As a result, the movable member 140 may fall off the holding member 160.

As a countermeasure, the steering device 100*b* according to this modified example includes the stopper 280 that restrains the movable member 140 from falling off the holding member 160 by coming into contact with at least one of the shaft member 118 and the movable member 140 after the impact absorbing member 180 starts to absorb impact.

Specifically, the movable member 140 that moves in a not normal manner as the impact absorbing member 180 starts to absorb impact is mechanically stopped after moving a certain distance. This can reduce the likelihood that the movable member 140 may fall off the holding member 160 in the event of a secondary collision, without degrading the impact absorbing performance. As a result, for example, the occurrence of secondary influence (e.g., falling of the steering mechanism 101 onto the driver's leg) resulting from the movable member 140 falling off the holding member 160 can be reduced. In short, the stopper 280 can further enhance the collision safety. Another case is assumed where, for example, the steering function (e.g., the function of transmitting information to a wheel turning mechanism) of the steering mechanism 101 is not lost after a secondary collision. In this case, since the movable member 140 has not fallen off the holding member 160, it may be possible for the driver to steer (change the turned angle of the turned wheels) by operating the operating member 110. In this case, the driver can move the vehicle to a safe position by operating the operating member 110.

In this modified example, more specifically, the stopper 280 includes the front stopper 281 that restricts frontward movement of the shaft member 118 and the movable member 140, and the rear stopper 282 that restricts rearward movement of the shaft member 118 and the movable member 140.

Thus, the movable member 140 is restrained from falling off the holding member 160 both when the shaft member 118 and the movable member 140 move frontward as a result of a secondary collision and when, for example, the driver pulls back the shaft member 118 and the movable member 140 that have moved frontward.

Specifically, even when the movable member 140 moves frontward as a result of a secondary collision, the movable member 140 is restrained by the front stopper 281 from falling off the holding member 160. Further, when, for example, the operating member 110 is pulled back by the driver after the secondary collision, the movable member 140 having moved rearward is restrained by the rear stopper 282 from falling off the holding member 160. Thus, the steering device 100b according to this modified example can restrain the movable member 140 that moves in a not normal manner due to a secondary collision from falling off the holding member 160 by the front and rear stoppers (the front stopper 281 and the rear stopper 282) of the movable member 140. Therefore, the collision safety is further enhanced.

In this modified example, each of the front stopper 281 and the rear stopper 282 has a buffer member that is disposed at such a position as to come into contact with at least one of the shaft member 118 and the movable member 140. Specifically, the front stopper 281 has a buffer member 281a that is disposed at such a position as to come into contact with the shaft member 118, and the rear stopper 282 has a buffer member 282a that is disposed at such a position as to come into contact with the connecting part 141 of the movable member 140.

Each of the buffer members 281a, 282a is a member made of a material having elasticity or flexibility, such as rubber or urethane, and functions to absorb at least part of the impact of a collision with an object. Therefore, when a secondary collision occurs and the shaft member 118 or the movable member 140 comes into contact with the front stopper 281 and the rear stopper 282, each of the two members coming into contact with each other is less likely to become deformed, damaged, or broken. Thus, both the front stopper 281 and the rear stopper 282 are more likely to fulfill the expected function (of restraining the movable member 140 from falling off the holding member 160).

It can also be said that each of the buffer members 281a, 282a is a member that absorbs the impact of a secondary collision. When the impact absorbing member 180 is a first impact absorbing member, each of the buffer members 281a, 282a can also be called a second impact absorbing member that starts to absorb impact after the first impact absorbing member starts to absorb impact. As the buffer member 281a or 282a, for example, a member that absorbs impact by deforming or breaking, or an elastic body, such as a helical spring, or a combination thereof can be adopted. When each of the buffer members 281a, 282a is called a second impact absorbing member, it can also be said that the second impact absorbing member can function as a stopper that restrains the movable member 140 from falling off the holding member 160.

As described above, the front wall 165c (see FIG. 2) of the intermediate member 165 of the holding member 160 functions as a restricting member that restricts frontward movement of the shaft member 118 in a secondary collision. Since the front wall 165c fulfills the same function as the front stopper 281, it can also be said that the front wall 165c is the front stopper of the stopper 280. Optionally, a buffer member may be disposed on the front wall 165c at such a position that the front end portion 118a of the shaft member 118 comes into contact with the buffer member. This can reduce deformation or damage of the shaft member 118 and the front wall 165c occurring upon the front end portion 118a coming into contact with the front wall 165c. As a result, the front wall 165c is more likely to fulfill the expected function as the front stopper.

It is not essential that the stopper 280 includes both the front stopper 281 and the rear stopper 282, and the stopper 280 should include at least one of the front stopper 281 and the rear stopper 282. Then, the likelihood that the movable member 140 may fall off the holding member 160 in the event of a secondary collision is reduced.

The part with which the rear stopper 282 comes into contact is not limited to the connecting part 141 but may instead be, for example, a part or a member that is provided in the movable member 140 and used only to come into contact (engage) with the connecting part 141.

The stopper 280 may include a rear stopper that restricts rearward movement of the movable member 140 and the shaft member 118 by coming into contact with the shaft member 118, not the movable member 140. For example, when the shaft member 118 has a protrusion that protrudes in a radial direction, the rear stopper can restrict rearward movement of the movable member 140 and the shaft member 118 by coming into contact with this protrusion from the rear side of the protrusion in axial direction.

Modified Example 3

Figure 13:
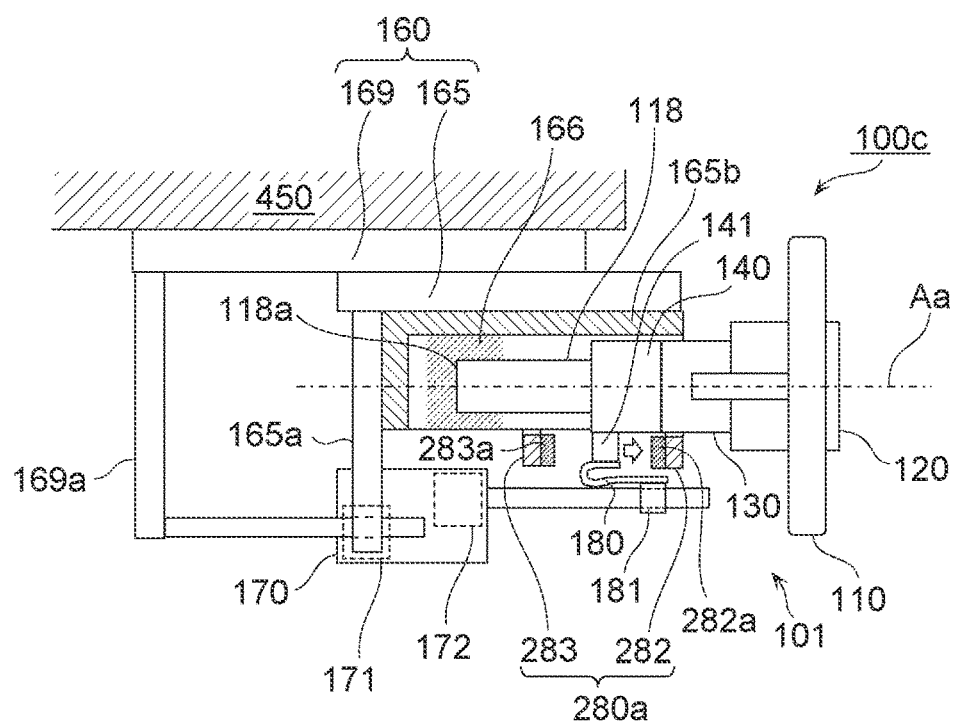
FIG. 13 is a view schematically showing the structure of a steering device according to Modified Example 3 of the embodiment.

FIG. 13 is a view schematically showing the structure of a steering device 100c according to Modified Example 3 of the embodiment. Like the steering device 100b according to Modified Example 2, the steering device 100c shown in FIG. 13 has a stopper 280a that restrains the movable member 140 from falling off the holding member 160 in a secondary collision.

Specifically, the stopper 280a according to this modified example includes a front stopper 283 that restricts frontward movement of the shaft member 118 and the movable member 140, and a rear stopper 282 that restricts rearward movement of the shaft member 118 and the movable member 140. The stopper 280a has this configuration in common with the stopper 280 according to Modified Example 2. In the stopper 280a according to this modified example, however, the front stopper 283 is disposed so as to restrain the movable member 140 from falling off the holding member 160 by coming into contact with the movable member 140.

More specifically, the front stopper 283 is disposed at such a position as to be able to come into contact with the connecting part 141 of the movable member 140. When the shaft member 118 and the movable member 140 move frontward as a result of a secondary collision, the front stopper 283 according to this modified example restricts further frontward movement of the movable member 140 by coming into contact with a part of the movable member 140. Thus, the movable member 140 is restrained from falling off the holding member 160.

As shown in FIG. 13, in this modified example, the front stopper 283 and the rear stopper 282 have buffer members 283a, 282a, respectively. Thus, as described in Modified Example 2, both the front stopper 283 and the rear stopper 282 are more likely to fulfil the expected function (of restraining the movable member 140 from falling off the holding member 160).

As in Modified Example 2, each of the buffer members 283a, 282a can be called a second impact absorbing member, and when each of the buffer members 283a, 282a is called a second impact absorbing member, it can also be said that the second impact absorbing member can function as a stopper.

Other Embodiment

The steering device according to the present disclosure has been described above based on the embodiment and the modified examples thereof. However, the applicable embodiment is not limited to the above embodiment and modified examples. Various modifications that are conceived and made to the above embodiment or modified examples by a person skilled in the art, and other embodiments formed by combining the above-described components are also included in the scope of the present disclosure, unless such modifications and embodiments depart from the gist of the disclosure.

For example, the external appearance and the configuration of the steering device 100 shown in FIG. 1 are merely examples, and the shapes, sizes, and positions of the components including the holding member 160, the movable member 140, the operating member 110, and the movement driving unit 170 are not limited to the shapes, sizes, and positions shown in FIG. 1. The configuration of each component need not be the configuration shown in FIG. 1 etc.

For example, the movable member 140 may be formed in a cylindrical shape surrounding an outer circumference of the shaft member 118. For example, the front end portion 118a of the shaft member 118 may be formed by a member separate from the shaft member 118, as long as that member moves in the front-rear direction along with the shaft member 118 as one unit. The EA space 166 need not be defined as a part of the internal space of the cover 165b (see FIG. 2). If there is a space in the steering device 100 in which the shaft member 118 moves to absorb impact and in which the shaft member 118 can also move when the operating member 110 is retracted to the retraction area 480, this space is defined as the EA space 166 regardless of the presence or absence of the cover 165b. When the holding member 160 does not have the cover 165b, it is preferable that a restricting member that restricts frontward movement of the shaft member 118 in a secondary collision be disposed in the holding member 160 or disposed as a separate member fixed to the vehicle body 450.

In the steering device 100 according to the embodiment, the space for adjustment 166a (see FIG. 11) may be provided between the shaft member 118 and the EA space 166. In this case, in the first control, the movable member 140 may be moved frontward relatively to the intermediate member 165 within such a range that the front end portion 118a of the shaft member 118 is located inside the space for adjustment 166a. The position of the operating member 110 in the front-rear direction may be adjusted by moving the movable member 140 relatively to the intermediate member 165 by the second driving part 172. When retracting the operating member 110 to the retraction area 480, the timing of starting to move the intermediate member 165 by the first driving part 171 may be after starting to move the movable member 140 by the second driving part 172. Also in this case, if the front end portion 118a of the shaft member 118 is kept inside the space for adjustment 166a until the controller 190 determines that the EA function is not required (No in S10 of FIG. 6B), the initial range of the EA space 166 is maintained during a period in which the EA function is required. If the movable member 140 has been moved to a little short of the EA space 166 by the time the controller 190 determines that the EA function is not required, the action of retracting the operating member 110 can be efficiently performed while the collision safety is secured.

Here, as shown in FIG. 2, when the space for adjustment 166a is provided in the range of a distance L (see FIG. 2) between the front end portion 118a of the shaft member 118 and the front wall 165c in the steering device 100 according to the embodiment, the length of the EA space 166 in the axial direction is changed.

Specifically, the controller 190 has the length of the EA space stored in a predetermined storage medium, such as a semiconductor memory, and changes the length of the EA space stored in the predetermined storage medium, for example, according to the running state of the vehicle. More specifically, for example, when the vehicle speed is higher, the EA function is more required than when the vehicle speed is lower. The controller 190 adjusts the length of the EA space, for example, in proportion to the vehicle speed. When the vehicle speed is lower and the EA function is less required, the controller 190 reduces the length of the EA space stored in the predetermined storage medium (rewrites the length to a smaller value). As a result, the length of the space for adjustment 166a becomes longer. This means that the movable range of the shaft member 118 (movable member 140) for position adjustment of the operating member 110 becomes wider, so that the position of the operating member 110 can be adjusted with greater flexibility. Thus, when the EA function is less required for reasons such as a lower vehicle speed, the controller 190 reduces the length of the EA space. As a result, the position of the operating member 110 can be adjusted according to the preference of a user etc. over a wider range, which can enhance the usability of the steering device 100.

When the vehicle speed is higher and the EA function is more required, and moreover the length of the EA space stored in the predetermined storage medium is shorter than L (see FIG. 2), the controller 190 increases the length of the EA space (rewrites the length to a larger value). Thus, the shaft member 118 or the movable member 140 used to absorb impact can move a longer distance, and the impact absorbing member 180 can absorb a larger amount of impact energy. As a result, the collision safety is enhanced. Thus, when the EA function is more required for reasons such as a higher vehicle speed, the controller 190 can prioritize safety and increase the length of the EA space (reduce the length of the space for adjustment 166a) at that point. The length of the EA space stored in the predetermined storage medium need not be the value of the length of the EA space itself, and may instead be, for example, a one-dimensional coordinate value in the axial direction or values indicating the positions of both ends of the EA space 166 in the axial direction. Alternatively, the length of the EA space may be represented by the difference between a maximum value L of the length of the EA space and the length of the space for adjustment 166a. Further, the information showing the length of the EA space need not be a numerical value; for example, a plurality of signs corresponding to different lengths may each represent the length of the EA space.

Thus, the controller 190 may change the length of the EA space stored in the predetermined storage area according to the running state of the vehicle. In this case, the controller 190 can perform the first control and the second control using the changed length of the EA space. In the first control, the controller 190 controls the movement driving unit 170 so as to move the movable member 140 along the axial direction in a state where the front end portion 118a of the shaft member 118 is located rearward of the EA space 166 having a length indicated by the changed length of the EA space. Thus, for example, movement of the movable member 140 relative to the intermediate member 165 can be used to adjust the position of the operating member 110 in the front-rear direction, so that the position can be adjusted over a wider range. When retracting the operating member 110 to the retraction area 480 in the second control, the controller 190 moves the movable member 140 frontward within such a range that the front end portion 118a of the shaft member 118 is located inside the EA space 166 having a length indicated by the changed length of the EA space. Thus, when retracting the operating member 110, the controller 190 retracts the operating member 110 using the EA space 166 of which the length in the axial direction has been changed. As in the above embodiment, the operating member 110 can be thus moved farther frontward than when the EA space 166 is not used. This allows for downsizing of the steering device 100, for example.

The movement driving unit 170 need not include the first driving part 171 and the second driving part 172 as one unit. The first driving part 171 and the second driving part 172 may be provided in the steering device 100 as separate parts and as mechanisms having independent driving sources.

The driving structure of the movement driving unit 170 is not particularly limited. The movement driving unit 170 may drive the movable member 140 etc. to move, for example, by a rack-and-pinion mechanism instead of a ball screw mechanism. The driving source of the movement driving unit 170 may be other than an electric motor, and the movement driving unit 170 may drive the movable member 140 etc. to drive, for example, by using hydraulic pressure.

The steering device 100 need not include the airbag 200. Even when not provided with the airbag 200, the steering device 100 can determine whether or not the EA function is required based on whether or not the EA function by the impact absorbing member 180 is effective.

Each of the various supplementary items described above for the steering device 100 according to the embodiment may be applied to each of the steering devices 100a, 100b according to Modified Examples 1 and 2.

The present disclosure is useful as a steering device that can expand a space in front of a driver as well as enhance collision safety. Therefore, the present disclosure is applicable to vehicles that are capable of manual driving as well as autonomous driving and have wheels, crawler belts, or the like, such as automobiles, buses, trucks, agricultural machines, and construction machines.

What is claimed is:

1. A steering device for steering a vehicle, the steering device comprising:
   a movable member configured to move along with a shaft member in an axial direction of the shaft member and to rotatably support the shaft member, the shaft member being connected, at a rear end of the shaft member in a front-rear direction of the vehicle, to an operating member;
   a holding member configured to hold the movable member so as to move in the axial direction;
   an impact absorbing member connected to the movable member, the impact absorbing member being configured to absorb impact as a front end portion of at least one of the shaft member and the movable member in the front-rear direction of the vehicle moves frontward in the axial direction inside a space for movement;
   a movement driving unit configured to move the movable member along the axial direction so as to change a position of the movable member in the axial direction in a vehicle body of the vehicle; and
   a controller, the controller being configured to perform first control and second control by which the movement driving unit is controlled, the first control being a control for moving the movable member along the axial direction within such a range that the front end portion is located rearward of the space for movement in the front-rear direction of the vehicle, and the second control being a control for moving the movable member along the axial direction within such a range that the front end portion is located inside the space for movement, wherein:
   the holding member includes a base member that is fixed to the vehicle body, and an intermediate member that is held by the base member so as to move in the axial direction and configured to hold the movable member so as to move in the axial direction;
   the movement driving unit includes a first driving part that moves the intermediate member relative to the base member, and a second driving part that moves the movable member relative to the intermediate member; and
   the controller is configured to control the first driving part in the first control so as to move the intermediate member relative to the base member in a state where the front end portion is located rearward of the space for movement in the front-rear direction of the vehicle, and configured to control the second driving part in the second control so as to move the movable member frontward in the front-rear direction of the vehicle within such a range that the front end portion is located inside the space for movement.

2. The steering device according to claim 1, wherein the controller is configured to allow the second control to start when it is determined that there is no need to absorb impact by the impact absorbing member.

3. The steering device according to claim 2, wherein the controller is configured to determine that there is no need to absorb impact by the impact absorbing member when the operating member is located frontward of a predetermined position in the front-rear direction of the vehicle.

4. The steering device according to claim 3, further comprising an airbag housing part, wherein:
   the airbag housing part is configured to move along with the shaft member in the axial direction and to house an airbag so as to allow the airbag to deploy; and the predetermined position is a position at which the airbag becomes unable to fulfill an expected function.

5. The steering device according to claim 2, wherein the controller is configured to determine that there is no need to absorb impact by the impact absorbing member when a running state of the vehicle meets a predetermined condition.

6. The steering device according to claim 1, wherein:
the controller is configured to change, according to a running state of the vehicle, a length of the space for movement in the axial direction that is stored in a predetermined storage area; and
the controller is configured to perform the first control and the second control using the changed length in the axial direction.

7. The steering device according to claim 1, wherein the controller is configured to change, according to a running state of the vehicle, a length of the space for movement in the axial direction by controlling the movement driving unit.

8. The steering device according to claim 1, further comprising a stopper, wherein the stopper is configured to restrain the movable member from falling off the holding member by coming into contact with at least one of the shaft member and the movable member after the impact absorbing member starts to absorb impact.

9. The steering device according to claim 8, wherein the stopper includes at least one of a front stopper that is configured to restrict frontward movement of the shaft member and the movable member and a rear stopper that is configured to restrict rearward movement of the shaft member and the movable member.

10. The steering device according to claim 9, wherein the at least one of the front stopper and the rear stopper includes a buffer member that is disposed at such a position as to come into contact with at least one of the shaft member and the movable member.

11. A steering device for steering a vehicle, the steering device comprising:
a movable member configured to move along with a shaft member in an axial direction of the shaft member and to rotatably support the shaft member, the shaft member being connected, at a rear end of the shaft member in a front-rear direction of the vehicle, to an operating member;
a holding member configured to hold the movable member so as to move in the axial direction;
an impact absorbing member connected to the movable member, the impact absorbing member being configured to absorb impact as a front end portion of at least one of the shaft member and the movable member in the front-rear direction of the vehicle moves frontward in the axial direction inside a space for movement;
a movement driving unit configured to move the movable member along the axial direction so as to change a position of the movable member in the axial direction in a vehicle body of the vehicle;
a controller, the controller being configured to perform first control and second control by which the movement driving unit is controlled, the first control being a control for moving the movable member along the axial direction within such a range that the front end portion is located rearward of the space for movement in the front-rear direction of the vehicle, and the second control being a control for moving the movable member along the axial direction within such a range that the front end portion is located inside the space for movement; and
a stopper that is configured to restrain the movable member from falling off the holding member by coming into contact with at least one of the shaft member and the movable member after the impact absorbing member starts to absorb impact.

12. The steering device according to claim 11, wherein the stopper includes at least one of a front stopper that is configured to restrict frontward movement of the shaft member and the movable member and a rear stopper that is configured to restrict rearward movement of the shaft member and the movable member.

13. The steering device according to claim 12, wherein the at least one of the front stopper and the rear stopper includes a buffer member that is disposed at such a position as to come into contact with at least one of the shaft member and the movable member.

* * * * *